(12) United States Patent
Wilson

(10) Patent No.: US 11,840,200 B2
(45) Date of Patent: Dec. 12, 2023

(54) WIPER SYSTEM WITH ARTICULATING PIVOT SHAFT

(71) Applicant: Trico Products Corporation, Rochester Hills, MI (US)

(72) Inventor: Michael Wilson, Clarkston, MI (US)

(73) Assignee: TRICO PRODUCTS CORPORATION, Rochester Hills, MI (US)

( * ) Notice: Subject to any disclaimer, the term of this patent is extended or adjusted under 35 U.S.C. 154(b) by 293 days.

(21) Appl. No.: 17/600,700

(22) PCT Filed: Apr. 1, 2019

(86) PCT No.: PCT/US2019/025168
§ 371 (c)(1),
(2) Date: Oct. 1, 2021

(87) PCT Pub. No.: WO2020/204902
PCT Pub. Date: Oct. 8, 2020

(65) Prior Publication Data
US 2022/0169208 A1    Jun. 2, 2022

(51) Int. Cl.
*B60S 1/34*    (2006.01)
(52) U.S. Cl.
CPC ................... *B60S 1/3493* (2013.01)

(58) Field of Classification Search
CPC ... B60S 1/3493; B60S 1/3409; F16C 2326/09
See application file for complete search history.

(56) References Cited

U.S. PATENT DOCUMENTS

| | | | |
|---|---|---|---|
| 4,780,926 A * | 11/1988 | Kondo | B60S 1/3409 15/250.352 |
| 5,809,610 A | 9/1998 | Eustache | |
| 5,890,256 A | 4/1999 | Eustache | |
| 2007/0271722 A1 * | 11/2007 | Powell | B60S 1/3409 15/250.14 |

* cited by examiner

*Primary Examiner* — Charles A Fox
*Assistant Examiner* — Gregory T Prather
(74) *Attorney, Agent, or Firm* — Bryan Cave Leighton Paisner LLP

(57) ABSTRACT

A windshield wiper system has an articulating pivot for wiping a curved glass surface of a vehicle. The articulating pivot has a pivot shaft assembly (64) having a first pivot ball (160) separated by a distance from a second pivot ball (166). The pivot shaft assembly is encased in an outer housing (158) and each pivot ball is supported by a bearing. A pinion gear is integrated with one of the first pivot ball, the second pivot ball, and/or the pivot shaft. A rack gear is integrated into one of the bearings and/or the housing. Rotational movement of the pinion gear along the rack gear articulates the pivot shaft as the pivot shaft is rotated.

27 Claims, 22 Drawing Sheets

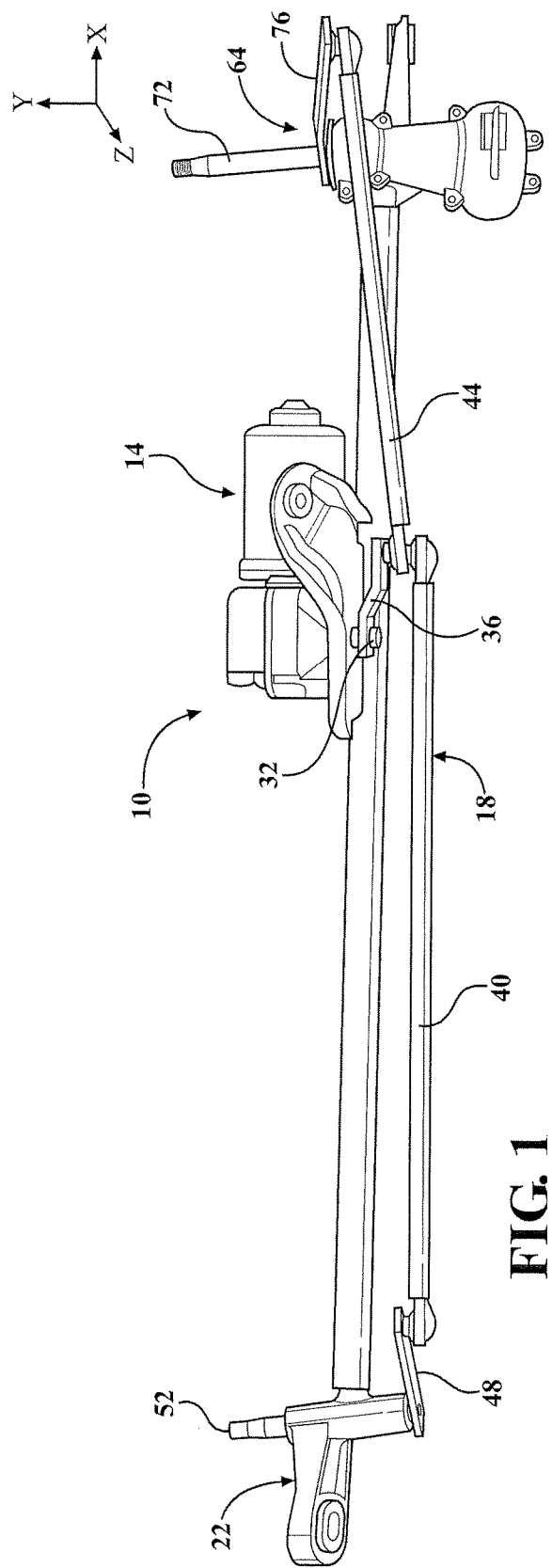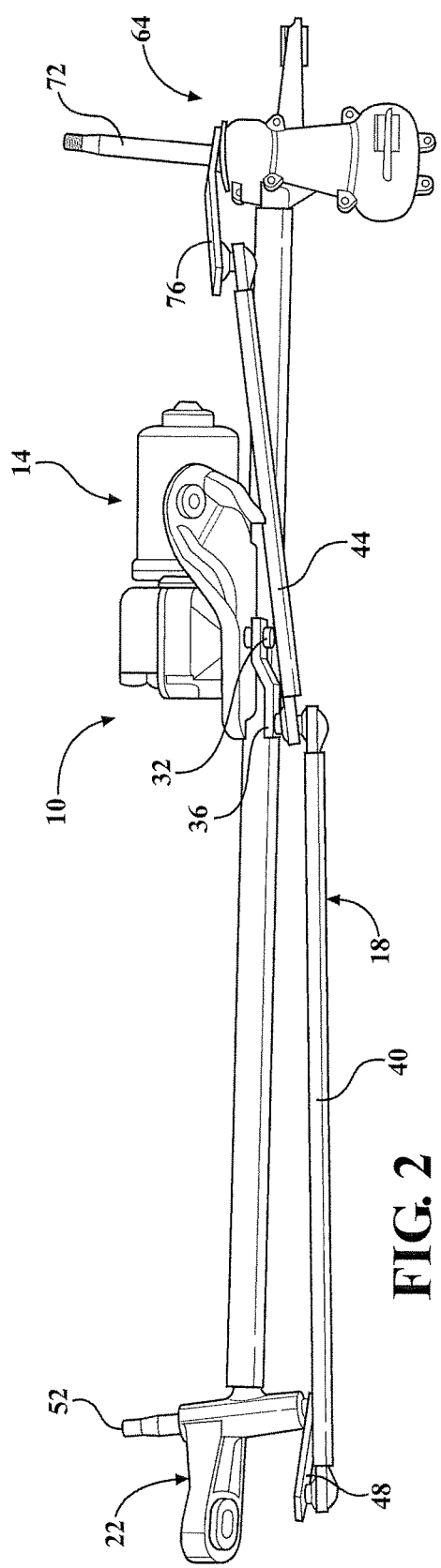
FIG. 1
FIG. 2

WIPER SYSTEM WITH ARTICULATING PIVOT SHAFT

BACKGROUND OF THE INVENTION

1. Field of the Invention

The present invention relates to a windshield wiper system for wiping a glass surface, such as a windshield, of a motor vehicle. More particularly, the invention relates a windshield wiper system having an internal mechanism to change the orientation of a wiper pivot shaft to dynamically alter the angle of orientation of the wiper blade rubber element to the glass surface.

2. Description of Related Art

Various articulating pivot shafts for vehicle windshield wiper systems are known in the art. One known system articulates a wiper arm pivot shaft by rotating a bevel gear attached to a bent pivot shaft along a stationary bevel gear sector which is rigidly attached to a cowl structure of a motor vehicle. Another known system passes a pivot shaft at an inclined angle through a cylindrical bearing such that rotation of the pivot shaft changes the relative pivot shaft orientation with respect to a holder for the bearing. Another known system comprises a pivot shaft passing through a center of a first bearing and passing through a second bearing at a point offset from the second bearing center.

However, known articulating wiper arm pivot systems are complex mechanically. Also, known systems may be inadequate in maintaining target ranges of the orientation of the wiper blade rubber element to certain curved glass surfaces. Further, known systems may be limited in the range of adjustment for a variety of specific applications.

It is desirable, therefore, to dynamically adjust the angle of orientation of the wiper blade rubber element to the glass surface. It is also desirable maintain blade attack angles within a desired range to provide good performance. Further, it is desirable to have a wipe pattern that cleans the areas of glass required by federal regulation. Finally, it is desirable to provide an adjustable pivot shaft orientation to improve wipe performance on highly wrapped glass surfaces.

SUMMARY OF THE INVENTION

A windshield wiper system has an articulating pivot for wiping a curved glass surface of a vehicle. The articulating pivot has a pivot shaft assembly having a first pivot ball separated by a distance from a second pivot ball. The pivot shaft assembly is encased in a housing and each pivot ball is supported by a bearing. A pinion gear is integrated with one of the first pivot ball, the second pivot ball, and/or pivot shaft. A rack gear is integrated into one of the bearings and/or the outer housing. Rotational movement of the pinion gear along the rack gear articulates the pivot shaft as the pivot shaft is rotated.

BRIEF DESCRIPTION OF THE DRAWINGS

Advantages of the present invention will be readily appreciated as the same becomes better understood by reference to the following detailed description when considered in connection with the accompanying drawings wherein:

FIG. 1 illustrates a perspective view of a windshield wiper system having an articulating pivot for a vehicle with an articulating pivot shaft in a first position according to an embodiment of the present invention;

FIG. 2 illustrates a perspective view of the windshield wiper system of FIG. 1 with the articulating pivot shaft in a second position according to an embodiment of the present invention;

DETAILED DESCRIPTION OF THE EMBODIMENTS

FIGS. 1 to 28 illustrate a windshield wiper system with an articulating pivot and components thereof according to embodiments described herein. Directional references employed or shown in the description, figures or claims, such as top, bottom, upper, lower, upward, downward, lengthwise, widthwise, left, right, and the like, are relative terms employed for ease of description and are not intended to limit the scope of the invention in any respect. Further, cross-section views of the articulating pivot are shown to illustrate their layers and components but such views are not necessarily to scale. Referring to the Figures, like numerals indicate like or corresponding parts throughout the several views.

Figure 24:
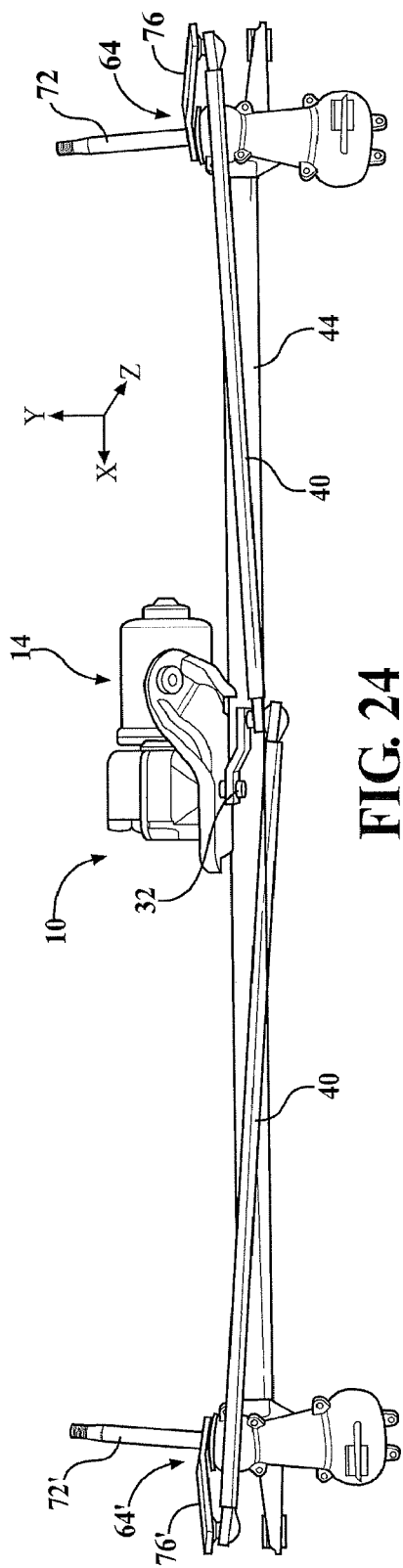
FIG. 24 illustrates a perspective view of a windshield wiper system having two articulating pivots for a vehicle according to a second embodiment of the present invention.
Figure 25:
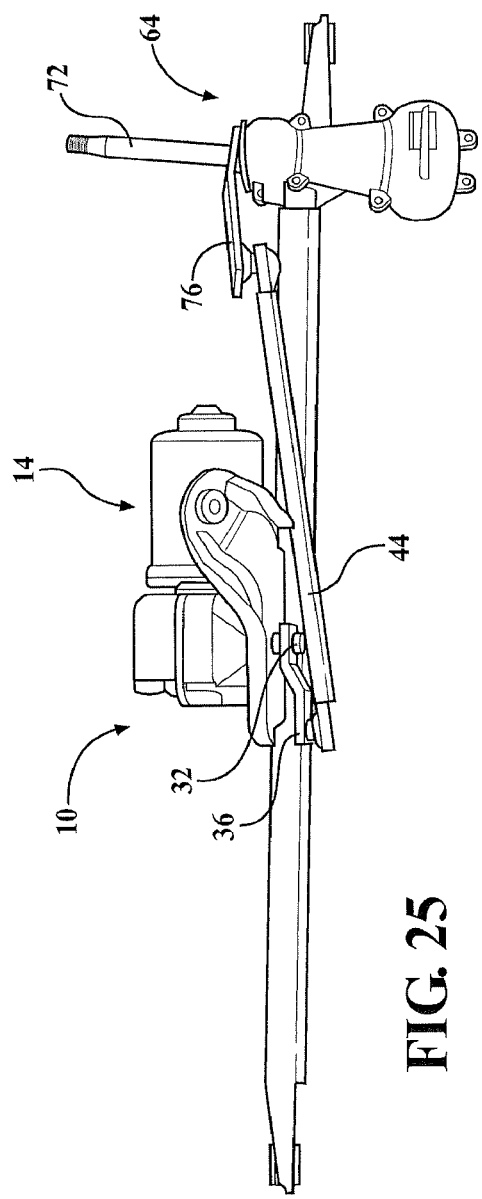
FIG. 25 illustrates a perspective view of a windshield wiper system having an articulating pivot for a vehicle according to a third embodiment of the present invention.

FIG. 1 illustrates a perspective view of a windshield wiper system 10 for a vehicle (not shown) having a motor 14 coupled to a wiper linkage system 18 to drive rotation of a non-articulating pivot assembly 22 and an articulating pivot assembly 64. The motor 14 rotates a drive shaft 32 which rotates a motor drive lever 36. The motor drive lever 36 is rotatably coupled with one or more links 40, 44. Link 40 is rotatably coupled with a pivot lever 48 which is further fixedly coupled with a non-articulating pivot shaft 52. Link 44 is rotatably coupled with an articulating pivot lever 76 which is further fixedly coupled with an articulating pivot shaft 72. Any combination of articulating pivot assemblies 64 and/or non-articulating pivot assemblies 22 suitable for an intended application may be used. For example, a windshield wiper system 10 may have an articulating pivot assembly 64 positioned on a driver's side of a vehicle, a passenger's side of a vehicle, and/or centrally-located midway along a lower portion of a windshield (not shown). Individual articulating pivot assemblies 64 may be configured with any amount of articulation suitable for a specific vehicle location and for a specific vehicle application. For example, a windshield wiper system 10 may comprise two articulating pivot assemblies 64, 64' as shown in FIG. 24. When a windshield wiper system 10 comprises two articulating pivot assemblies 64, 64', one articulating pivot assembly 64 may have the same, a greater amount, or a lesser amount of articulation than a second articulating pivot assembly 64' if desired to wipe a specific windshield. Alternatively, a windshield wiper system 10 may comprise a sole articulating pivot assembly 64 (i.e., a windshield wiper system 10 having a single articulating pivot assembly 64 as shown in FIG. 25). Also generally shown in FIG. 1 are an X-axis, Y-axis, and Z-axis for reference.

Typically, a wiper arm assembly (not shown) is operatively coupled to each pivot shaft 52 such that rotation of the pivot shaft 52 moves the wiper arm through a generally arcuate path to clean a windshield (not shown) having a contoured glass surface. A typical wiper arm assembly (not shown) comprises a wiper arm coupled with a wiper blade. The wiper blade has a rubber element which is wiped across the windshield to clean the glass surface. A wipe cycle comprises moving the wiper arm assembly from a first position to a second position and returning the wiper arm assembly to the first position. A wipe pattern is an area of the glass surface cleaned by the wiper blade as the wiper arm moves through a wipe cycle. A wiper attack angle is an operating parameter of wiper systems and is defined as an angle of orientation of the wiper blade rubber element to the glass surface. The wiper system design pivot orientation is a primary design characteristic of the wiper system that influences the attack angle that the blade makes to the glass surface throughout the wipe pattern. Attack angle, as measured at the wiper arm (center of the blade), varies from park inwipe to outwipe from a positive 3 to 5 degrees (target) at inwipe to −3 to −5 degrees (target) at outwipe. The angle the rubber element makes to the glass surface induces the element rubber lower body to flip over at its hinge at the wipe pattern reversals (inwipe and outwipe). The positive to negative inwipe to outwipe helps the rubber lower body to reverse and facilitates good wipe quality.

Blades that are wiping a windshield that are outside of target attack angle ranges are much more prone to wipe defects including poor wipe quality and adverse noise effects. Attack angles that are too large in magnitude (positive or negative) can lay the blade over to the extent that the non-wiping areas of the rubber element can contact the glass surface. Too great a layover of the wiper element can cause smearing and squeaking. Too little layover at the reversals can cause the rubber to stand up and cause the wiper blade to chatter as the wiper blade moves across the glass surface.

The attack angle range is generally locked in based on the shape of the wiper pattern (where on glass surface the blade moves to perform the wiping function), the pivot shaft orientation, and the shape of the glass in the wipe pattern area. Given that the glass surface is provided and controlled by the vehicle manufacturer, and the wipe patterns/areas of the glass surface that need to be cleaned are controlled by federal regulation, the only way to effectively design for and control the attack angles and attack angle range is to select the best fit pivot shaft orientation.

As shown in FIG. 1, the non-articulating pivot assembly 22 has a fixed pivot shaft 52 orientation. For some glass surfaces, a single shaft orientation does not allow a feasible workable design with attack angles/rise and fall for the system to be within acceptable limits for desired function. For these glass surfaces, the articulating pivot assembly 64, also shown in FIG. 1, allows for a range of pivot shaft angles to be utilized effectively increasing the ability for the wiper system to function on highly wrapped glass surfaces. The articulating pivot assembly 64, according to an embodiment of the present invention, has a pivot shaft 72 orientation that changes based on the rotational position of the articulating pivot shaft 72. The rotational position of the articulating pivot shaft 72 is represented by the position of the lever 76 which is rotatably coupled with one of the links 44 and fixedly coupled with the articulating pivot shaft 72. FIG. 2 illustrates the change in the articulating pivot shaft 72 orientation when the motor 14 rotates the motor drive lever 36 into a second position, moving the links 40, 44 to a second position, and rotating the pivot shafts 52, 72 to a second rotational position. The change in shaft orientation of the articulating pivot shaft 72 is apparent when comparing FIGS. 1 and 2. The non-articulating pivot shaft 52 maintains a single shaft orientation in both FIGS. 1 and 2. In comparison, the articulating pivot shaft 72 has different shaft orientations in when comparing FIGS. 1 and 2.

Figure 3A:
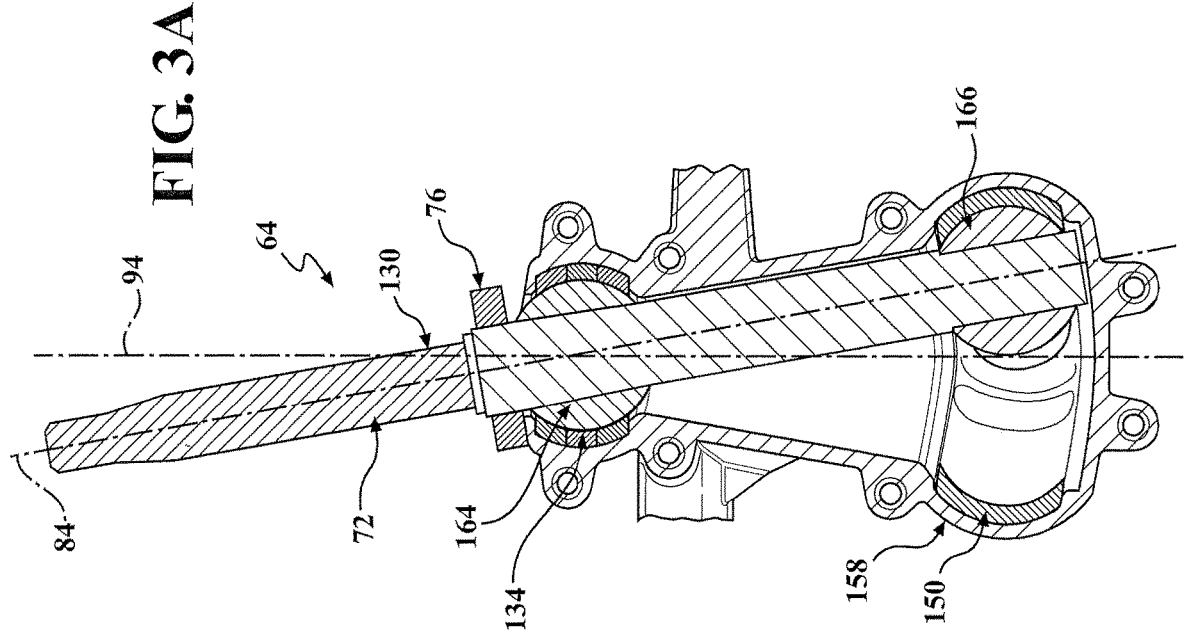
FIG. 3A illustrates a cross-sectional view of the articulating pivot of FIG. 3 with the articulating pivot shaft in the first position according town embodiment of the present invention.
Figure 3:
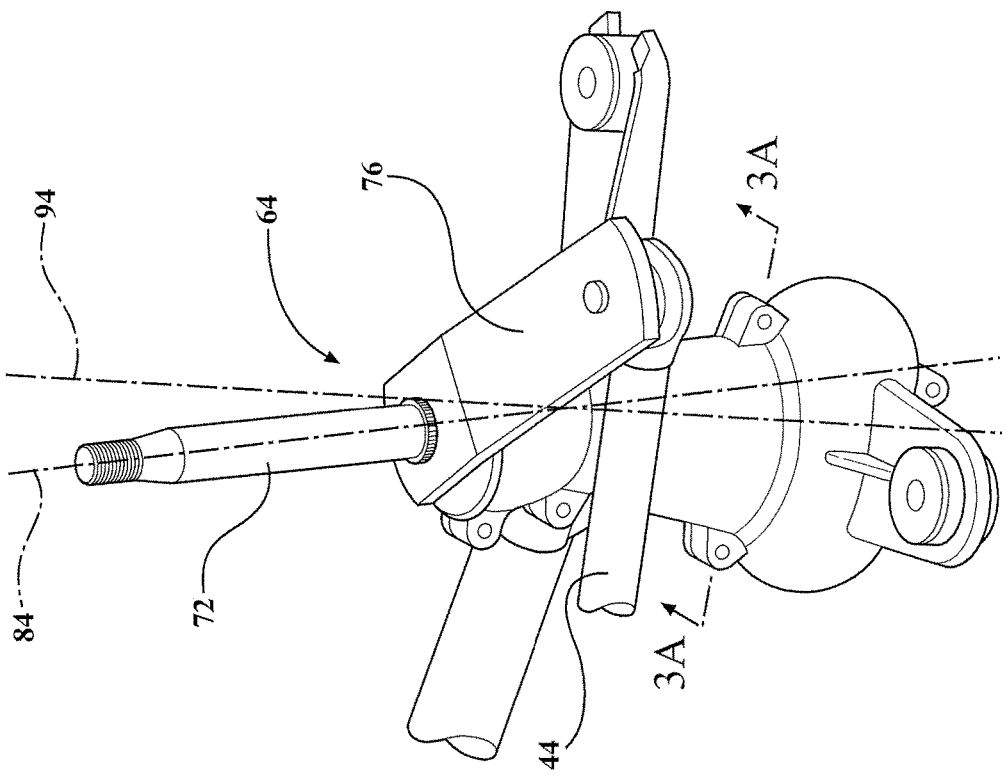
FIG. 3 illustrates a perspective view of the articulating pivot of FIG. 1 with the articulating pivot shaft in the first position according to an embodiment of the present invention.
Figure 4A:
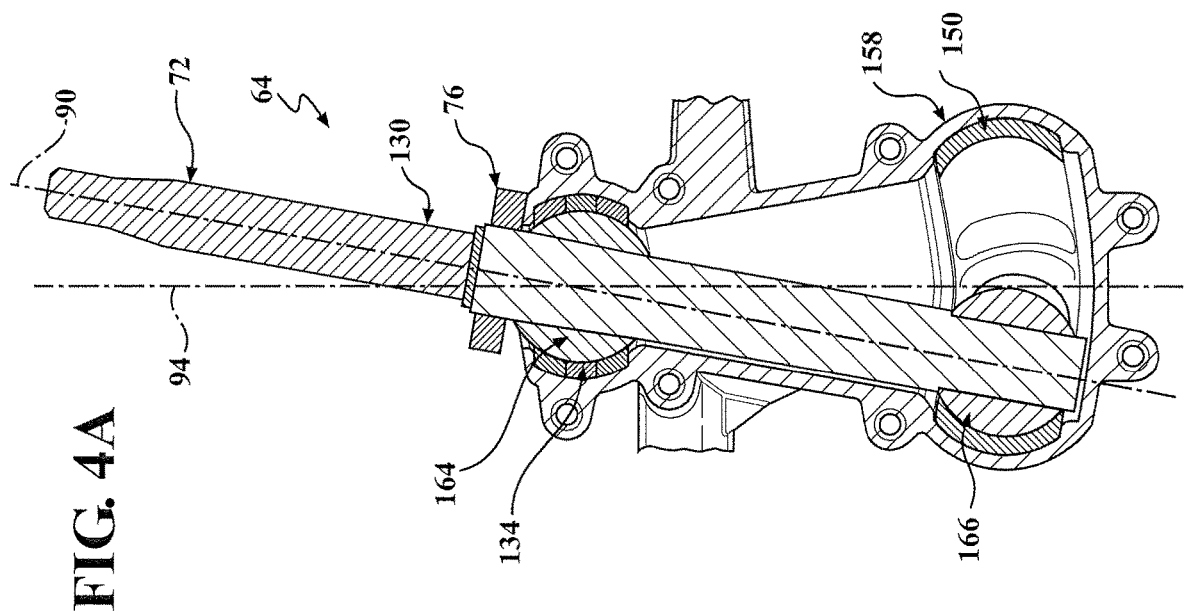
FIG. 4A illustrates a cross-sectional view of the articulating pivot of FIG. 4 with the articulating pivot shaft in the second position according to an embodiment of the present invention.
Figure 4:
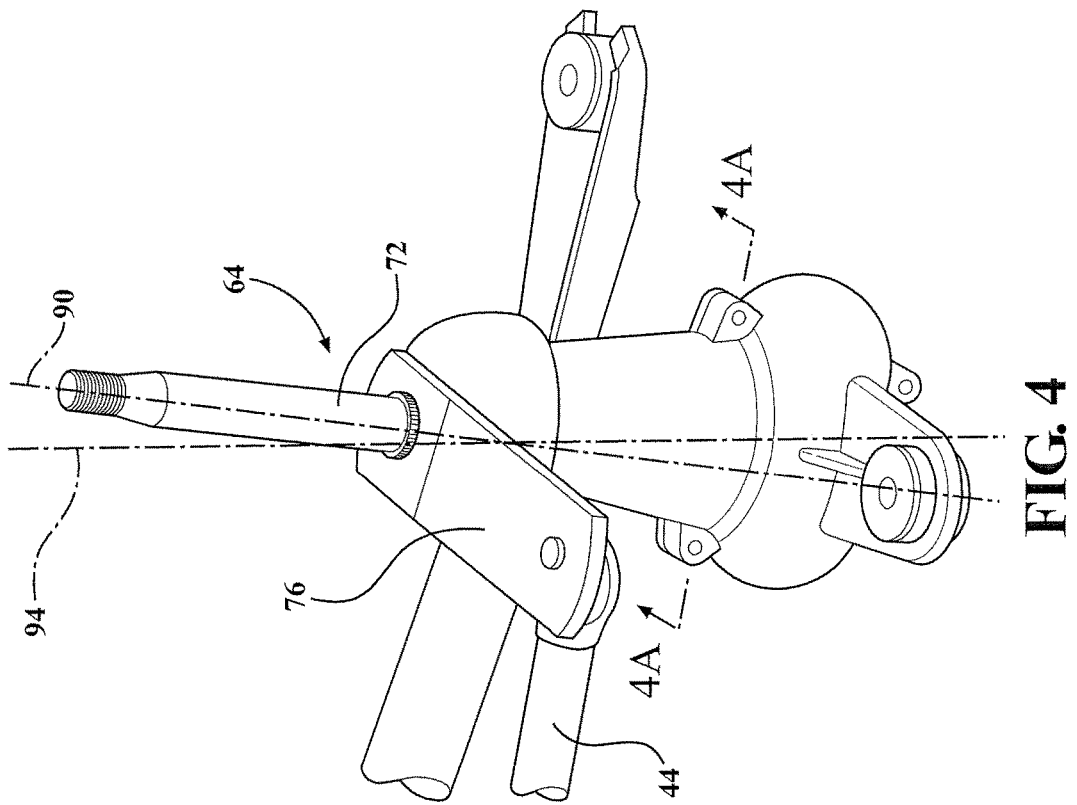
FIG. 4 illustrates a perspective view of the articulating pivot of FIG. 2 with the articulating pivot shaft in the second position according to an embodiment of the present invention.

FIGS. 3 and 4 illustrate the respective orientations of the articulating pivot shaft 72 in a first rotational position 84 and a second rotational position 90 with respect to a representative axis 94 passing longitudinally through the articulating pivot assembly 64. Cutaway views of the articulating pivot assembly 64 with the articulating pivot shaft 72 in the first position and in the second position are illustrated in FIGS. 3A and 4A, respectively. Referring to FIG. 3A, the articulating pivot assembly 64 comprises a pivot shaft assembly 130, an upper bearing 134, and a lower bearing 150 assembled within a pivot housing 158. The pivot shaft assembly 130 comprises the pivot shaft 72, the lever 76 fixedly coupled with the pivot shaft 72 and having a ball stud 160 with a stud portion 162 fixedly attached to the lever 76, and an upper pivot ball 164 and a lower pivot ball 166 fixedly coupled with the pivot shaft 72.

Figure 5:
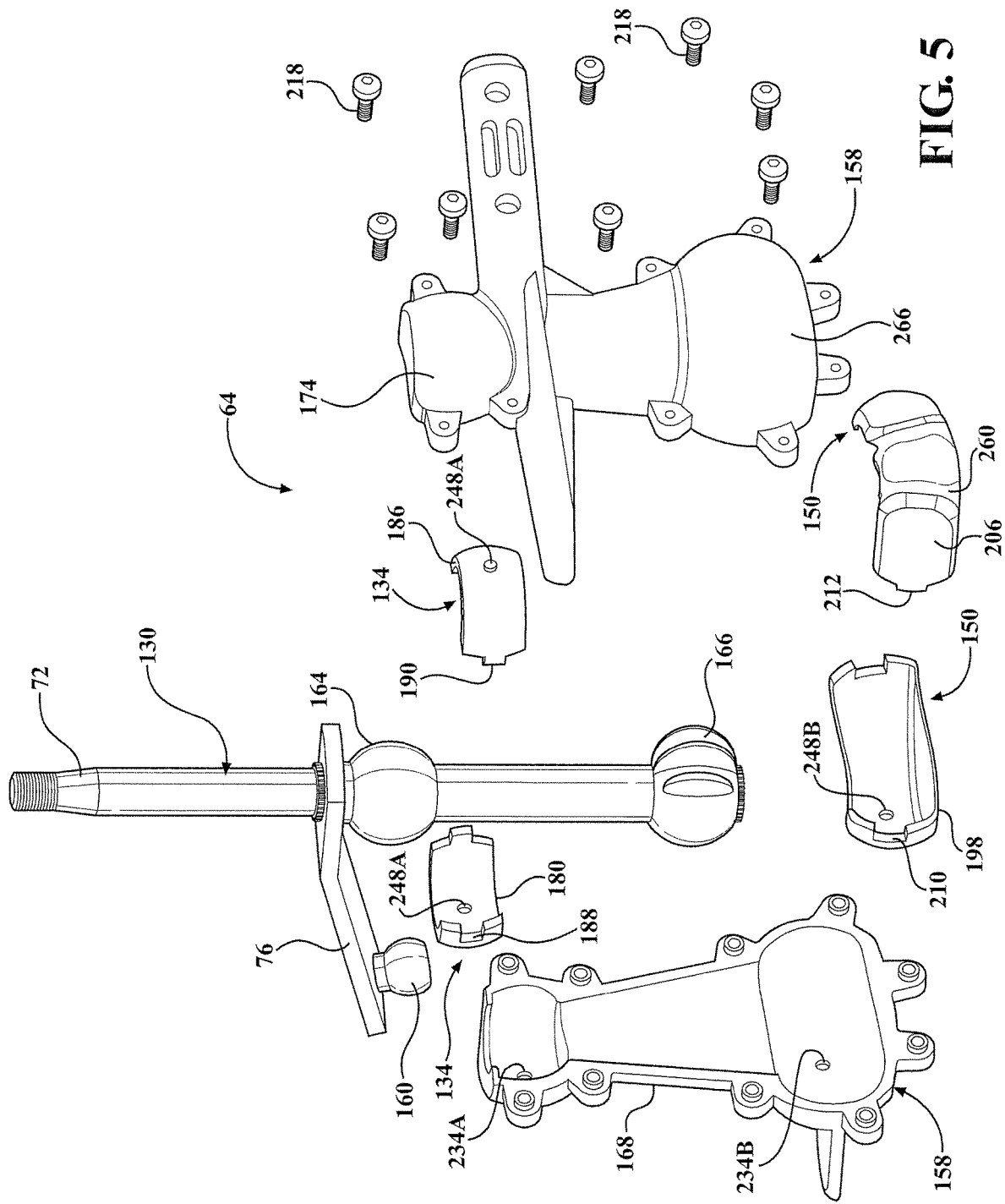
FIG. 5 illustrates an exploded view of the articulating pivot of FIG. 2 with the articulating pivot shaft in the second position according to an embodiment of the present invention.

As shown in the exploded view of FIG. 5, the pivot housing 158 comprises a front housing 168 and a rack housing 174. Likewise, the upper bearing 134 comprises front and rear bearing portions 180, 186. The front bearing portion 180 has one or more notches and/or bosses 188 which matingly engage with a respective one or more bosses and/or notches 190 in the rear bearing portion 186 when the front and rear upper bearing portions 180, 186 are assembled to form the upper bearing 134. Similarly, the lower bearing 150 comprises a front bearing portion 198 and a rack bearing portion 206. The front lower bearing portion 198 has one or more notches and/or bosses 210 which matingly engage with a respective one or more bosses and/or notches 212 in the rack bearing portion 206 when the front and rack lower bearing portions 198, 206 are assembled to form the lower bearing 150.

Also shown in FIG. 5, one or more fasteners 218 mechanically fasten the front housing 168 with the rack housing 174 when the articulating pivot 64 is assembled. The front and rack housings 168, 174 optionally have one or more recessed areas and/or bosses 234A, 234B which matingly engage with bosses and/or recessed areas 248A, 248B in the respective upper and lower bearing portions 180, 186, 198. The rack bearing portion 206 has an outer profile 260 which matingly engages with an inner profile 266 of the rack housing 174, which will be shown in greater detail in FIGS. 6-10.

Figure 6:
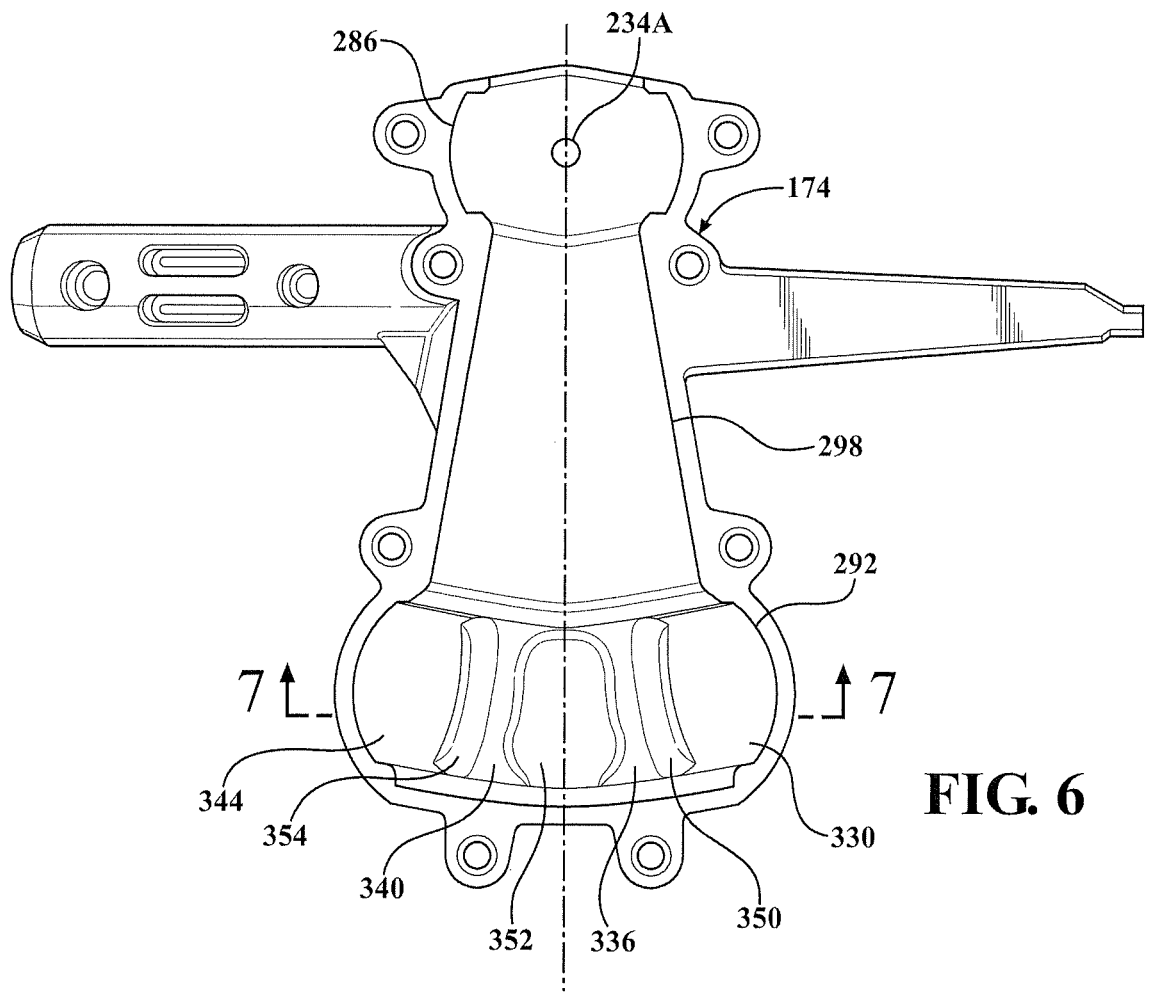
FIG. 6 illustrates a perspective view of a rack pivot housing according to an embodiment of the present invention.

FIG. 6 shows an interior perspective view of the rack housing 174. The rack housing 174 has one or more bosses and/or recesses 234A which are configured to matingly engage with recesses and/or bosses on an exterior surface of the upper and lower bearings 134, 150. The rack housing 174 further has a first cavity 286 configured to hold the upper rear bearing portion 186 and a second cavity 292 configured to hold the rack bearing portion 206. A third cavity 298 forms a passageway for the pivot shaft 72.

Figure 7:
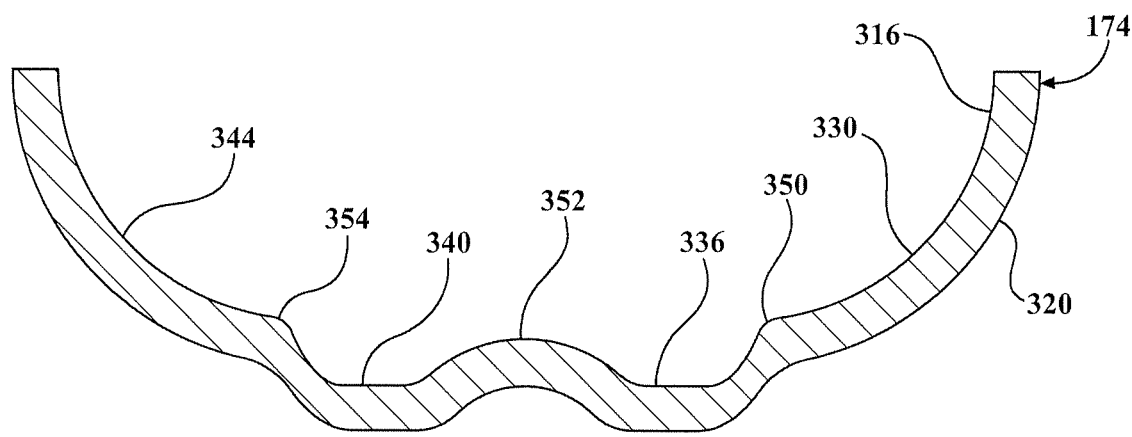
FIG. 7 illustrates a cross-sectional view of the rack pivot housing of FIG. 6 according to an embodiment of the present invention.

FIG. 7 illustrates a cross-sectional view through the second cavity 292 of the rack housing 174 of FIG. 6 showing contours of the inner surface 316 and exterior surface 320. The contour of the inner surface 316 generally comprises a first curved section 330, two recessed sections 336, 340, a second curved section 344, and transitions 350, 352, 354 between adjacent sections 330, 336, 340, 344. Other contours suitable for an intended application may be used.

Figure 8:
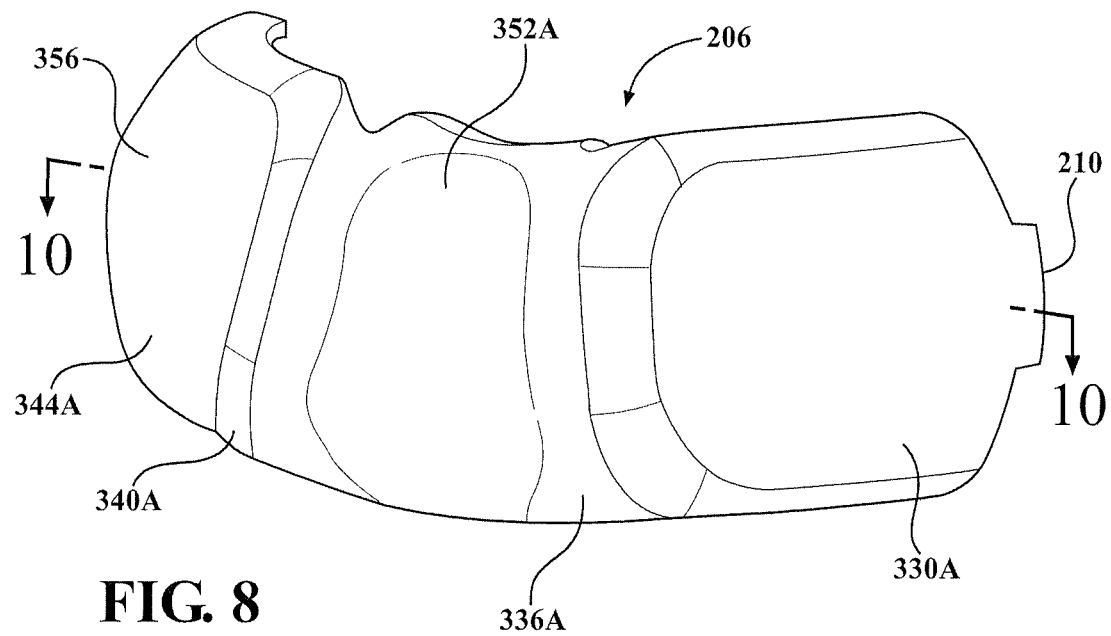
FIG. 8 illustrates a perspective view of a rack bearing according to an embodiment of the present invention.
Figure 9:
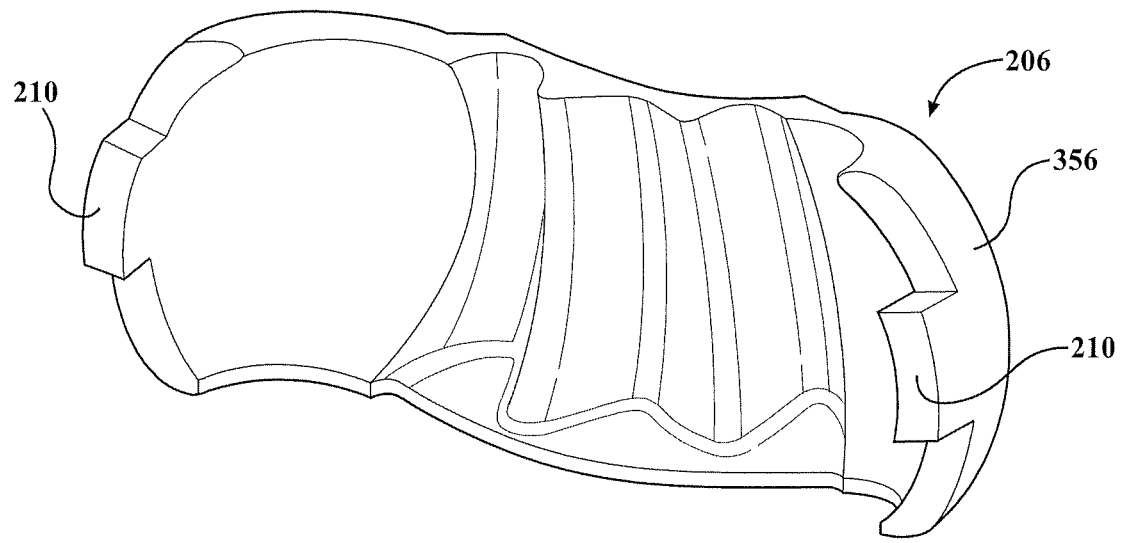
FIG. 9 illustrates a perspective view of the rack bearing of FIG. 8 according to an embodiment of the present invention.
Figure 10:
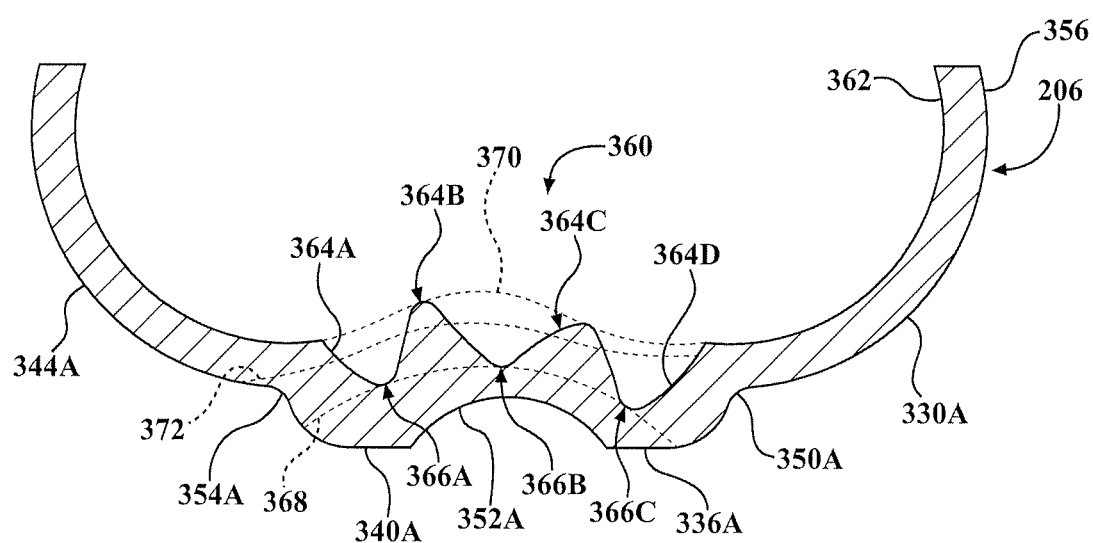
FIG. 10 illustrates a cross-sectional view of the rack bearing of FIG. 8 according to an embodiment of the present invention.
Figure 11A:
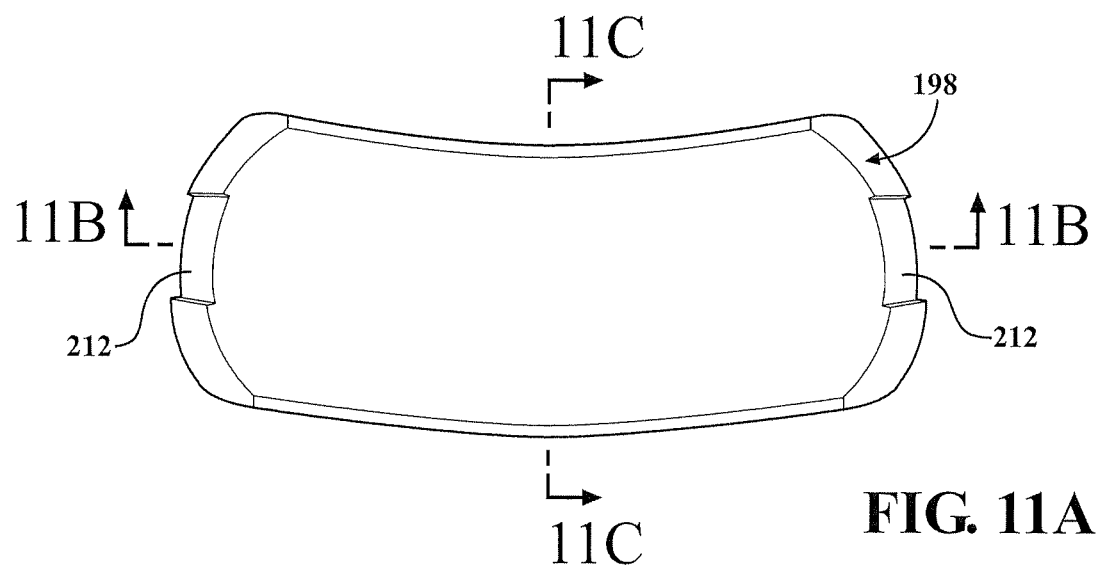
FIG. 11A illustrates a perspective view of a front lower bearing according to an embodiment of the present invention.
Figure 11B:
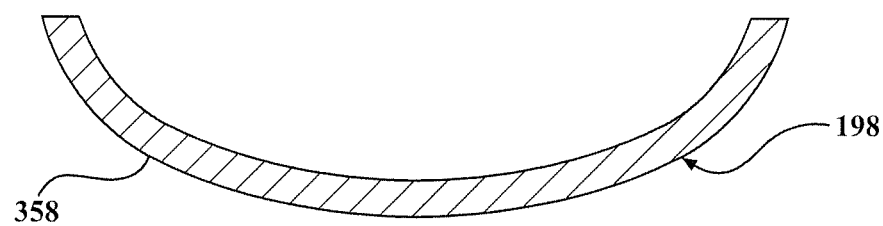
FIG. 11B illustrates a cross-sectional side view of the front lower bearing of FIG. 11A according to an embodiment of the present invention.
Figures 11C, 11D:
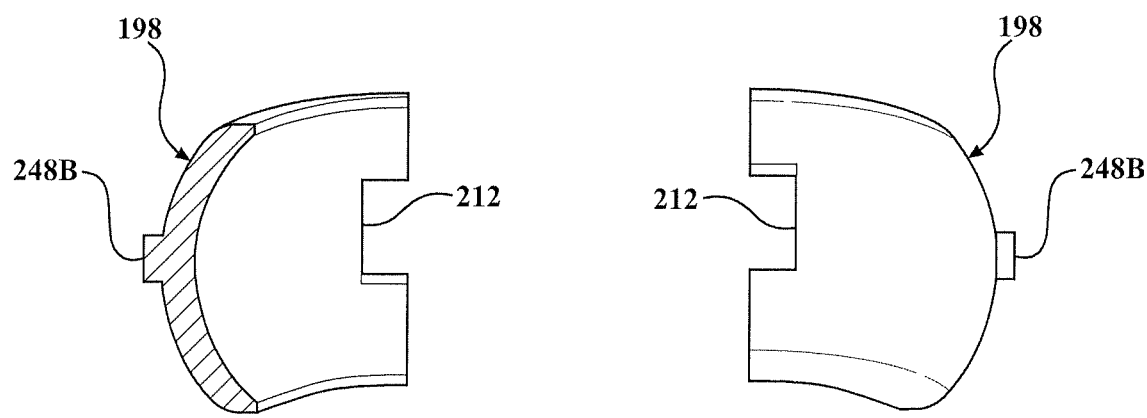
FIG. 11C illustrates a cross-sectional top view of the front lower bearing of FIG. 11A according to an embodiment of the present invention.
FIG. 11D illustrates a side view of the front lower bearing of FIG. 11A according to an embodiment of the present invention.

FIGS. 8 and 9 show exterior and interior perspective views of the rack lower bearing 206. A cross-sectional of the rack lower bearing 206 is shown in FIG. 10. FIG. 11A shows a perspective view of the front lower bearing 198. A cross-sectional top view, a cross-sectional side view, and a side view of the front lower bearing 198 are shown in FIGS. 11B-11D, respectively.

The front lower bearing 198 and the rack lower bearing 206 are assembled to form the lower bearing 150. As shown in FIG. 9, the rack lower bearing 206 has one or more generally rectangular tabs 210 projecting in a generally circumferential direction which are configured to matingly engage with one or more generally rectangular notches 212 in the front lower bearing 198 (see FIG. 11A). Other shapes, configurations, and methods of assembling the rack lower bearing 206 with the front lower bearing 198 suitable for an intended application may be used.

Generally, the contour of the inner surface 316 of the second cavity in the rack housing 174 is configured to matingly engage with an exterior surface 356 of the rack bearing portion 206. The inner contours of the first and second cavities 286, 292 in the front and rack housings 168, 174 are configured to matingly engage with the outer surfaces of the respective bearing portion 180, 186, 198, 206. Thus, the contour of the inner surface 316 of the rack housing 174 (represented by sections 344, 354, 340, 352, 336, 350, and 330 shown in FIG. 7) is configured to matingly engage with the contour of an exterior surface 356 of the rack bearing 206 (represented by sections 344A, 354A, 340A, 352A, 336A, 350A, and 330A shown in FIG. 10). The second cavity (not shown) in the front housing 168 is configured to matingly engage with an exterior surface 356 of the front lower bearing 198. The front lower bearing 198 optionally has a generally cylindrical protrusion 248B projecting radially from the exterior surface 356. The front housing 168 has a generally cylindrical recess (not shown) in the second cavity configured to matingly engage with the front lower bearing 198 cylindrical projection 248B. The circumferential tabs/notches 210, 212 maintain the alignment between the rack bearing 206 and the front lower bearing 198. The engagement between the outer contour 356, 358 projections 248B, 336A, 340A of the rack lower bearing 206 and the front lower bearing 198 with the interior surface contour 316 and recesses 234B, 336, 340 of the of the second cavity in the housings 168, 174 restricts rotation of the lower bearing assembly 150 when assembled with the pivot housing 158. Other combinations of matingly engaged features suitable for an intended application may be used.

As illustrated in FIG. 10, a non-linear rack 360 is formed in the interior contour of the rack bearing 206 and configured to operatively engage with the lower pivot ball 166 to articulate the pivot shaft 72 as the pivot shaft 72 is rotated by the lever 76. It will be appreciated that any rack geometry suitable for an intended application may be used including a linear rack. In the exemplary embodiment shown in FIG. 10, the non-linear rack 360 comprises a plurality of teeth 364A-364D, each pair of teeth separated by a respective notch 366A-366C. The root of the notches 366A-366C are positioned along a contoured root line 368. Likewise, the tip of each tooth 364A-364D is positioned along a contoured tip line 370. A roll line 372 shows the line of engagement between the non-linear rack 360 and the rack bearing 206. A specific non-linear rack 360 profile is selectable by one skilled in the art based on a desired articulation path of the pivot shaft 72. The engagement between the rack bearing 206 and the non-linear rack 360 will be discussed below with respect to FIGS. 17 and 21-23.

Figure 12A:
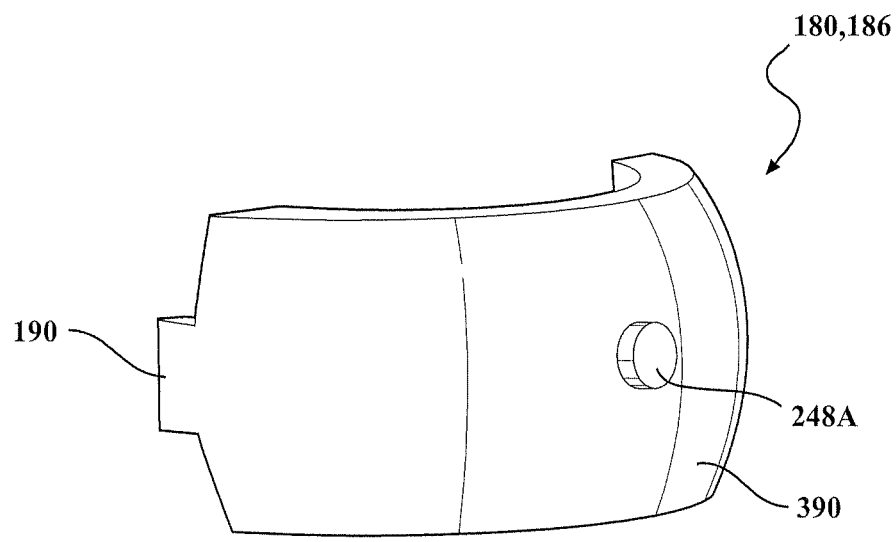
FIG. 12A illustrates a perspective view of an upper bearing according to an embodiment of the present invention.
Figure 12B:
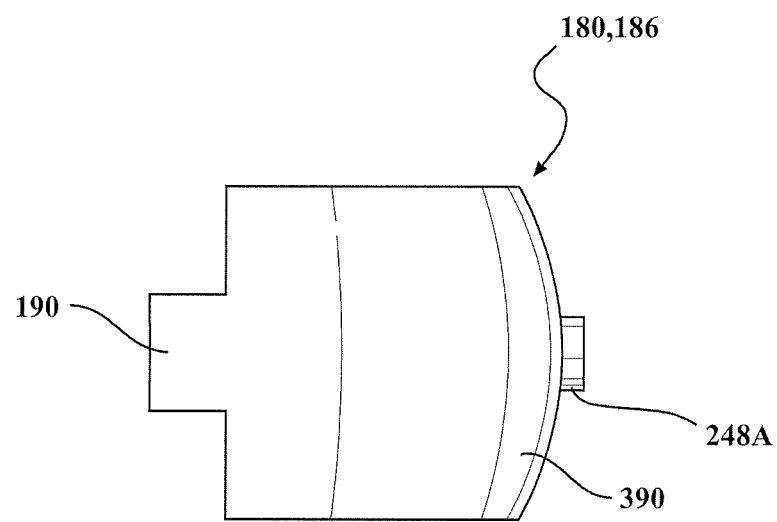
FIG. 12B illustrates a side view of the upper bearing of FIG. 12A according to an embodiment of the present invention.
Figure 12C:
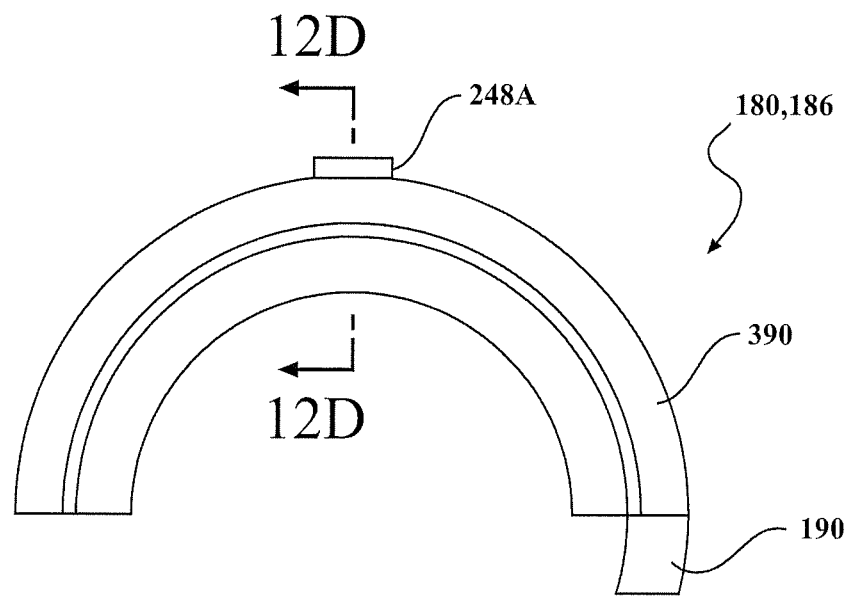
FIG. 12C illustrates a top view of the upper bearing of FIG. 12A according to an embodiment of the present invention.
Figure 12D:
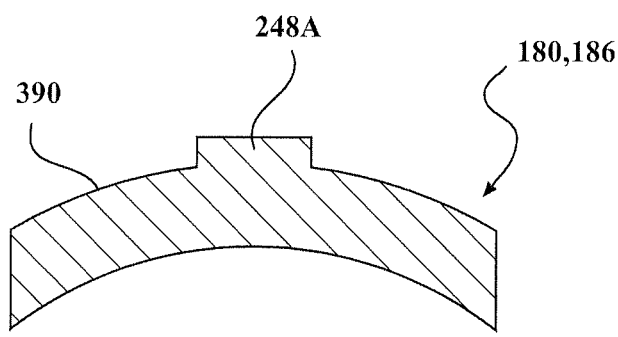
FIG. 12D illustrates a cross-sectional view of the upper bearing of FIG. 12C taken along section line D-D according to an embodiment of the present invention.
Figure 12E:
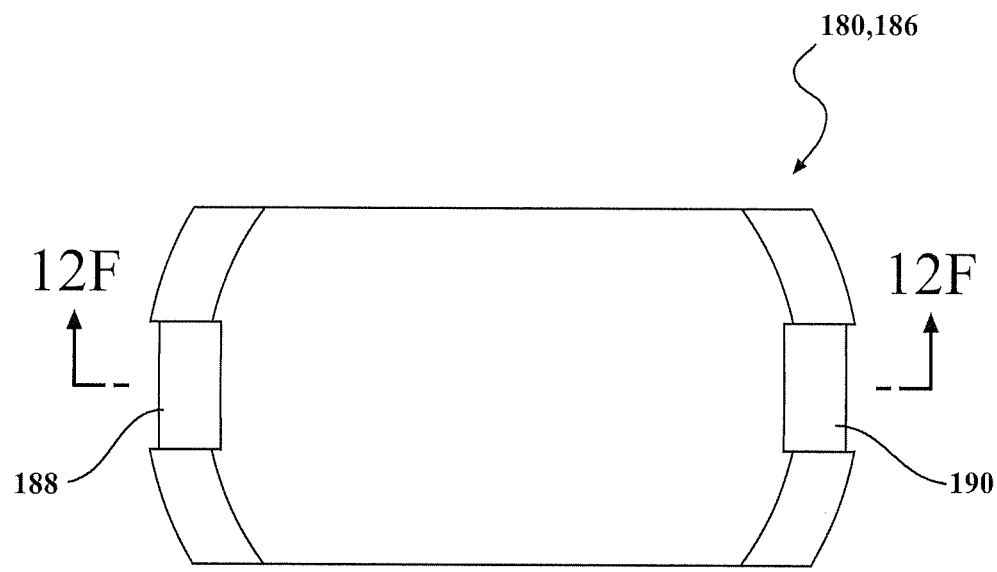
FIG. 12E illustrates a front view of the upper bearing of FIG. 12A according to an embodiment of the present invention.
Figure 12F:
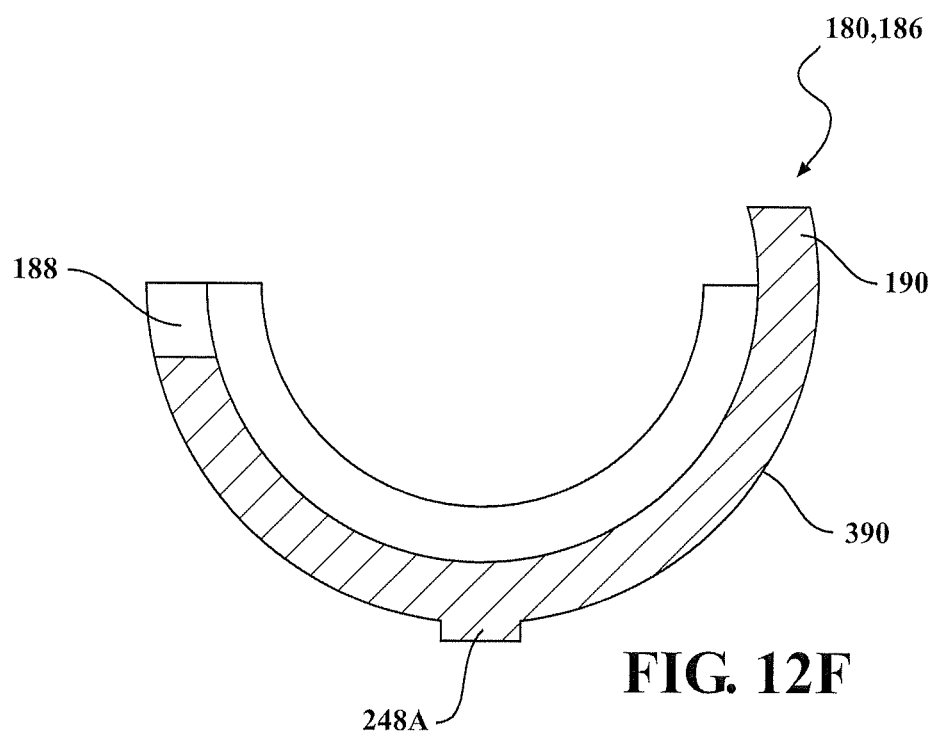
FIG. 12F illustrates a cross-sectional view of the upper bearing of FIG. 12E taken along section line F-F according to an embodiment of the present invention.

The upper bearing assembly 134 comprises a front upper bearing portion 180 and a rear upper bearing portion 186 as shown in FIG. 5. Optionally, the front upper bearing 180 and the rear upper bearing 186 may comprise generally identical parts such as shown in FIGS. 12A-12F. FIGS. 12A and 12B show a perspective view and a side view of the upper bearing portion 180, 186, respectively. A top view and a cross-sectional view of the upper bearing portion 180, 186 are shown in FIGS. 12C and 12D, respectively. A front view as well as a second cross-sectional view are shown in FIGS. 12E and 12F, respectively. As generally shown in the figures, the upper bearing assembly 134 is generally a truncated hollow spherical bearing.

While not specifically shown in the Figures, the contour of an exterior surface 390 of the upper bearing portion 180, 186 is configured to matingly engage with the interior surface of the upper bearing cavity 286 of the housing 168, 174. Further, the upper bearing portion 180, 186 has a generally cylindrical boss 248A projecting outward from the exterior surface 390 of the bearing portion 180, 186 (see FIG. 12A) which is configured to matingly engage the recess 234A in the housings 168, 174. It will be appreciated that any shape of the boss 248A suitable for an intended application may be used. Likewise, a boss (not shown) may project from the housing 168, 174 and matingly engage with a recess (not shown) on the upper bearing portion 180, 186. The engagement of the cylindrical boss 248A and the recess 234A align the bearing portions 180, 186 within the housing 168, 174 and may prevent rotation of the upper bearing assembly within the housing 168, 174 when assembled as part of the articulating pivot assembly 64.

As illustrated in FIG. 5, two upper bearing portions 180, 186 are assembled to form the upper bearing assembly 134. As shown in FIGS. 5 and 12A-12F, the upper bearing portion 180, 186 has a generally rectangular tab 190 projecting in a generally circumferential direction and configured to matingly engage with a generally rectangular notch 188 in the upper bearing portion 180, 186. Thus, the rectangular tab 190 of a first upper bearing portion 180 is matingly assembled with the rectangular notch 188 of the second upper bearing portion 186 to form the upper bearing assembly 134. It will be appreciated that any configuration of tabs, notches, or other known assembly methods may be used to align the two halves 180, 186 of the upper bearing assembly 134. Alternatively, the front upper bearing portion 180 and the rear upper bearing portion 186 may be non-identical parts.

Figure 13:
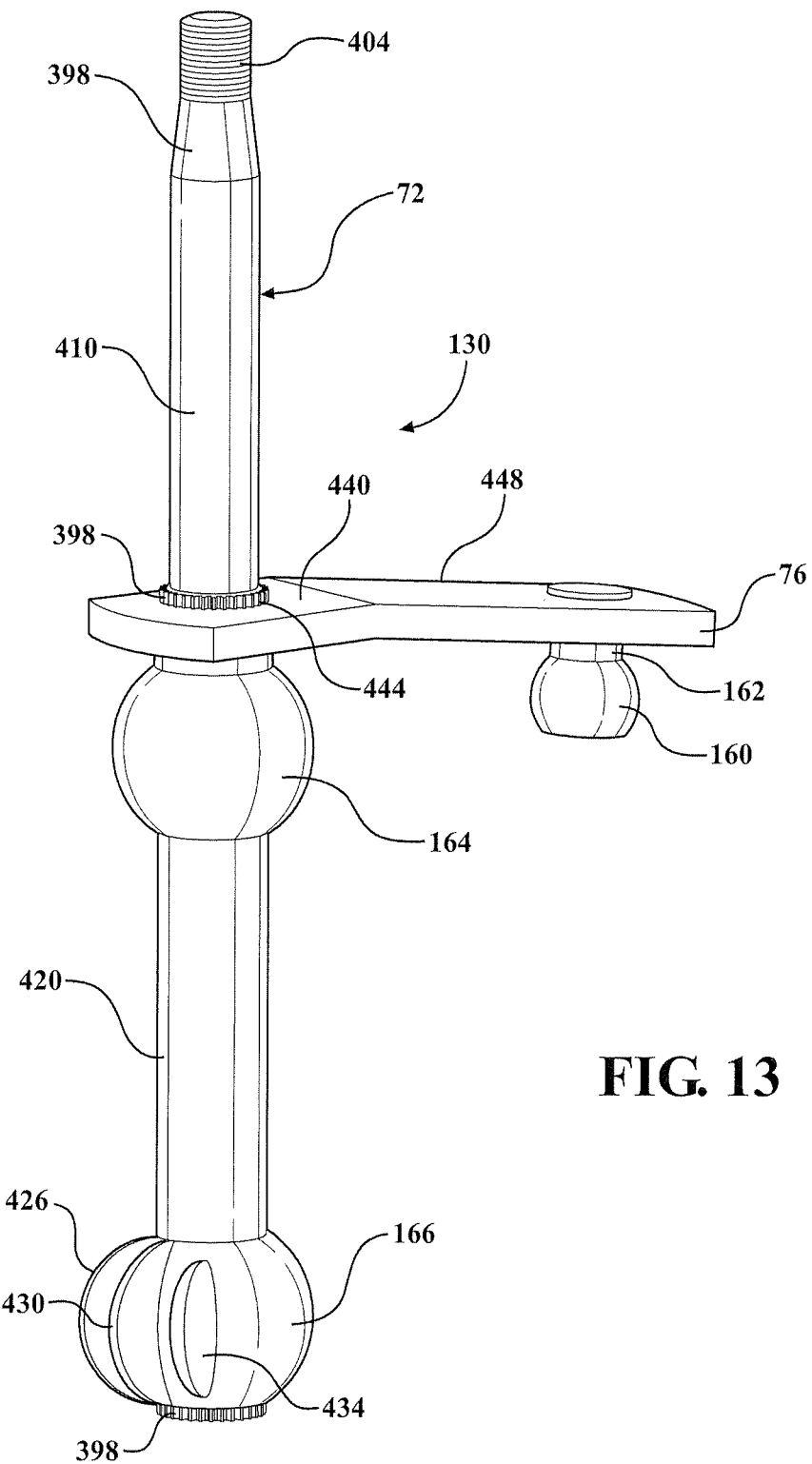
FIG. 13 illustrates a perspective view of a pivot shaft assembly of FIG. 5 according to an embodiment of the present invention.

Referring to FIG. 13, the pivot shaft assembly 130 comprises a generally cylindrical shaft 72 having one or more splined sections 398 and/or threaded sections 404. The pivot shaft 72 may have one or more sections 410, 420, with diameters suitable for an intended application and/or to aid in assembly. Assembled with the pivot shaft 72 are the upper pivot ball 164, the lever 76, and the lower pivot ball 166. The upper pivot ball 164 is generally spherical. The lower pivot ball 166 is generally spherical with one or more gear teeth 426, 430, 434 projecting radially from the spherical surface.

It will be appreciated that the one or more gear teeth 426, 430, 434 may project radially from the spherical surface of the lower pivot ball 166, the upper pivot ball 164, and/or may project radially from the cylindrical surface of one or more sections 410, 420 of the pivot shaft 72. Further, while not specifically shown, the one or more gear teeth 426, 430, 434 may be formed by notches recessed into the surface of one or more of the upper pivot ball 164, the lower pivot ball 166, and/or the pivot shaft 72. Also, while the lever 76 is shown fixedly coupled with the shaft 72 at a location between the upper pivot ball 164 and the threaded end section 404, the lever 76 optionally may be fixedly coupled at any point along the pivot shaft 72 suitable for an intended application, including between the lower pivot ball 166 and a lower end 398 of the pivot shaft 72. It will be readily appreciated that the description of "upper" and "lower" as related to a relative position along the pivot shaft 72 are arbitrary, i.e., the upper pivot ball 164 and lower pivot ball 166 may be referred to as a first pivot ball 164 and a second pivot ball 166, respectively. Further, the relative position of the first pivot ball 164 and the second pivot ball 166 may be changed with respect to the distance from the threaded shaft section 404. For example, the first pivot ball 164 and the second pivot ball 166 may be fixedly coupled to the pivot shaft 72 such that the second pivot ball 166 is positioned between the first pivot ball 164 and the threaded shaft section 404.

The lever 76 may comprise a first section 440 having a splined through hole 444 configured to be assembled with one of the splined sections 398 of the pivot shaft 72. A second lever section 448 may project at an angle from the first lever section 440 as illustrated in FIG. 13. Alternatively, the second lever section 448 and the first lever section 440 may be aligned. The ball stud 160 is mechanically joined with the second lever section 448. A longitudinal axis passing through the ball stud 160 projects at an angle to a longitudinal axis passing through the pivot shaft 72. Alternatively, the ball stud 160 longitudinal axis and the pivot shaft 72 longitudinal axis may be parallel with one another. It will be appreciated that any orientation, shape, and position of the lever 76 and the ball stud 160 suitable for an intended application may be used.

Figure 14:
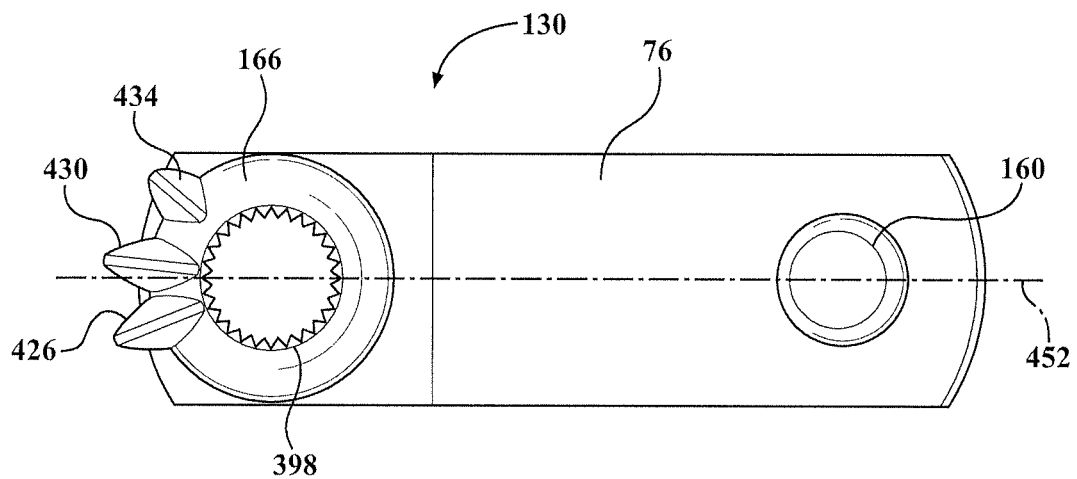
FIG. 14 illustrates a bottom view of the pivot shaft assembly of FIG. 13 according to an embodiment of the present invention.
Figure 15:
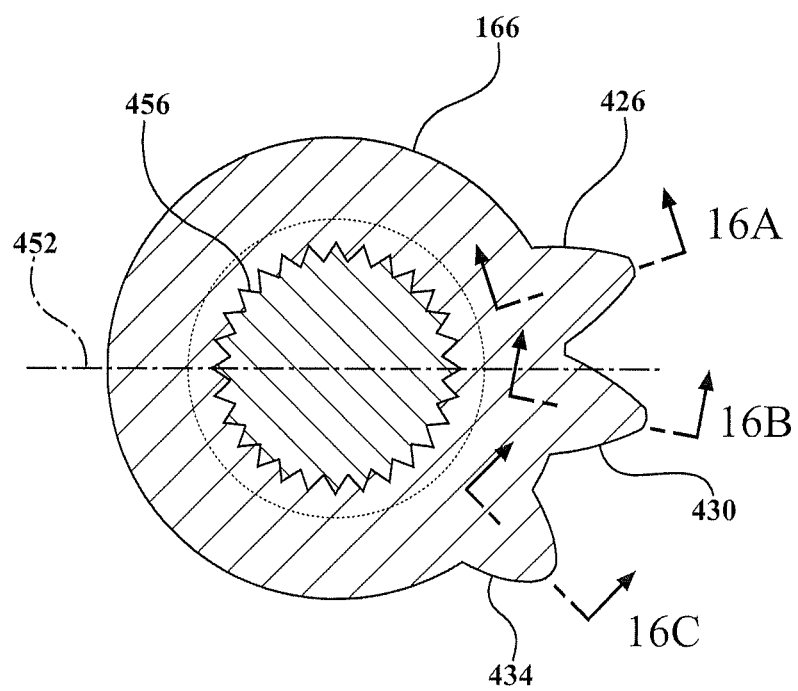
FIG. 15 illustrates a cross-sectional view of a lower pivot ball shown in FIG. 13 according to an embodiment of the present invention.
Figure 16A:
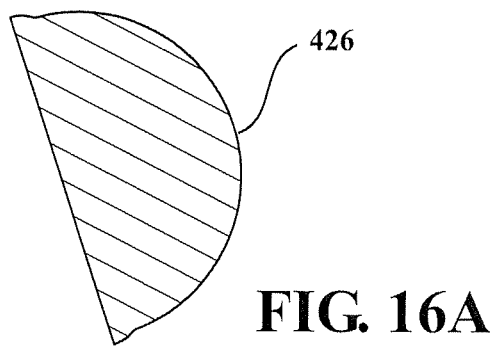
FIGS. 16A-16C illustrate cross-sectional views of tooth profiles of the lower pivot ball shown in FIG. 15 according to an embodiment of the present invention.
Figure 16B:
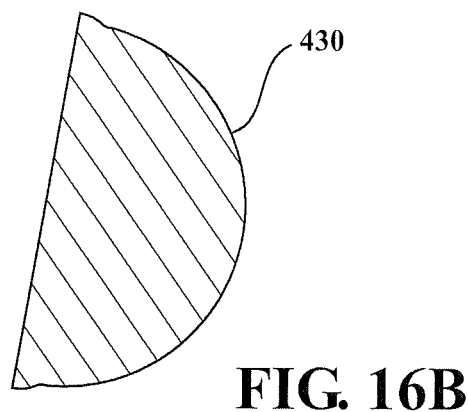
Figure 16C:
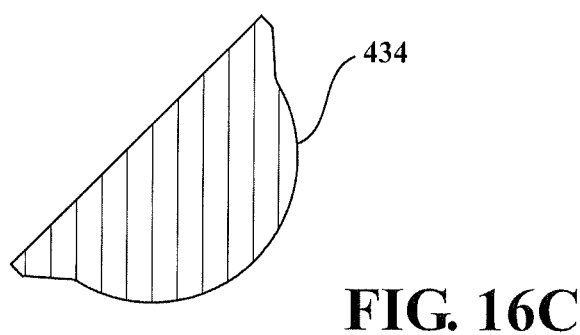

The relative position and orientation of the lever 76 and the gear teeth 426, 430, 434 projecting from the lower pivot ball 166 are illustrated in FIG. 14. A reference plane 452 is defined by the pivot shaft 72 longitudinal axis and a center of the ball 160. The position, size, and number of the gear teeth 426, 430, 434 are selected based on the desired articulation as the pivot shaft 72 is rotated. A cross-sectional view of the lower pivot ball 166 is shown in FIG. 15 illustrating the size and orientation of the gear teeth 426, 430, 434 with respect to the reference plane 452. Also shown is an internal through hole 456 having an internal spline configured to matingly engage an external spline 398 on the pivot shaft 72. A cross-sectional view of the individual gear teeth 426, 430, 434 showing relative size and orientation on the lower pivot ball 166 are shown in FIGS. 16A-16C. It will be appreciated that the shape, number, and position of the gear teeth 426, 430, 434 on the lower pivot ball are selected based on a desired articulating path of the pivot shaft 72. It will be appreciated that any combination of orientation, shape, and position of gear teeth 426, 430, 434 suitable for an intended application may be used. Likewise, the individual gear teeth 426, 430, 434 may be of generally identical size. Further, the gear teeth 426, 430, 434 optionally may be positioned on the upper pivot ball 164 and/or on the pivot shaft 72 as desired for an intended application. While not specifically shown, the gear teeth 426, 430, 434 may be formed by notches in the surface of one or more of the pivot balls 164, 166 and/or the pivot shaft 72 such that the gear teeth 424, 430, 434 are formed by the sides of the notches. Alternatively, the gear teeth 426, 430, 434 optionally may comprise a combination of projecting teeth away from the surface and notches recessed into the surface.

Figure 17:
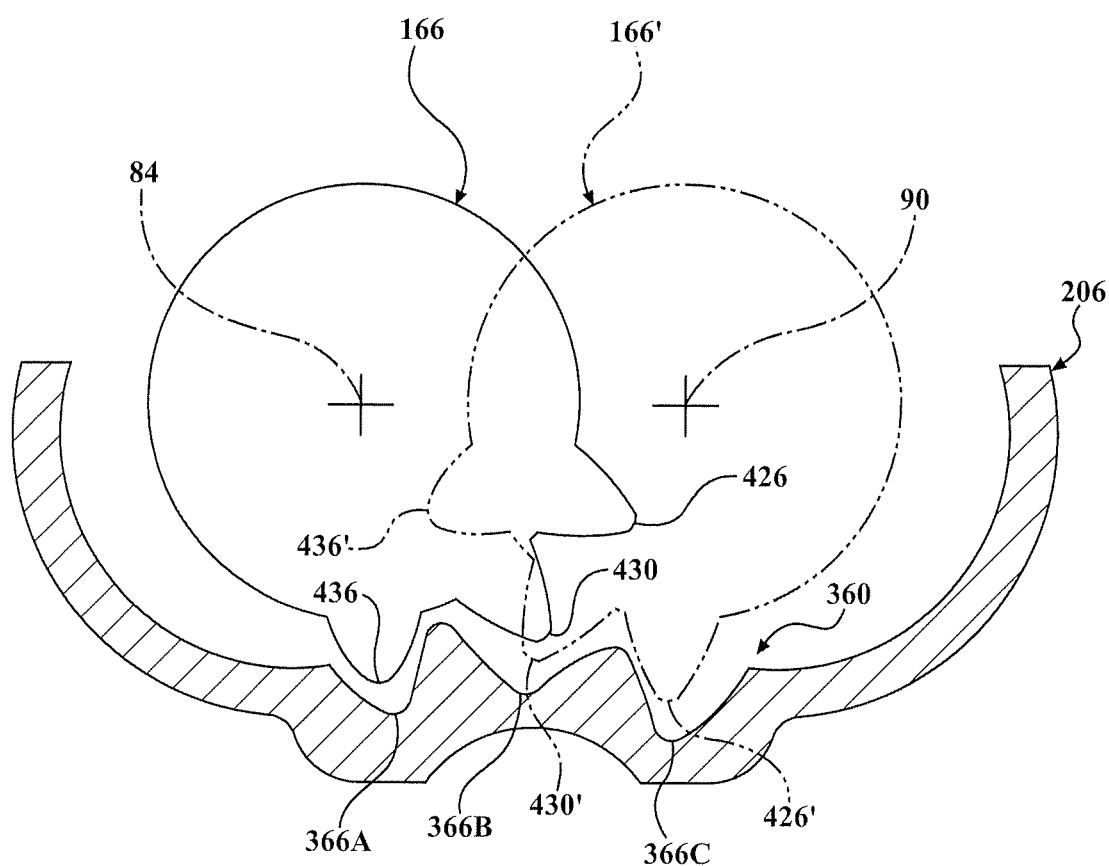
FIG. 17 illustrates a partial cross-sectional view of the articulating pivot of FIG. 3A with the lower ball in a first position and in a second position according to an embodiment of the present invention.

The gear teeth 426, 430, 434 on the lower pivot ball 166 meshingly engage with the non-linear rack 360 integrated within the rack bearing 206 as illustrated in FIG. 17. The longitudinal axis of the pivot shaft 72 in a first orientation 84 and in a second orientation 90 is represented by the relative position of the longitudinal axis 84, 90 passing through the cross-section shown in FIG. 17. When the lower pivot ball 166 is in a position aligned with longitudinal axis 84, gear tooth 436 is meshingly engaged with notch 366A. When the pivot shaft 72 rotates towards a position aligned with longitudinal axis 90, the lower pivot ball, as represented by element 166', rotates along the rack 360 such that gear tooth 436' disengages from notch 366A and gear tooth 426' meshingly engages with notch 366C. It will be appreciated that the shape, orientation, number, and position of the gear teeth 426, 430, 434, as well as the rack 360 roll line 372, individual notch profiles, number, and orientation of notches 366A, 366B, 366C, suitable for an intended application may be used in order to articulate the pivot shaft 72 as desired.

Figure 18:
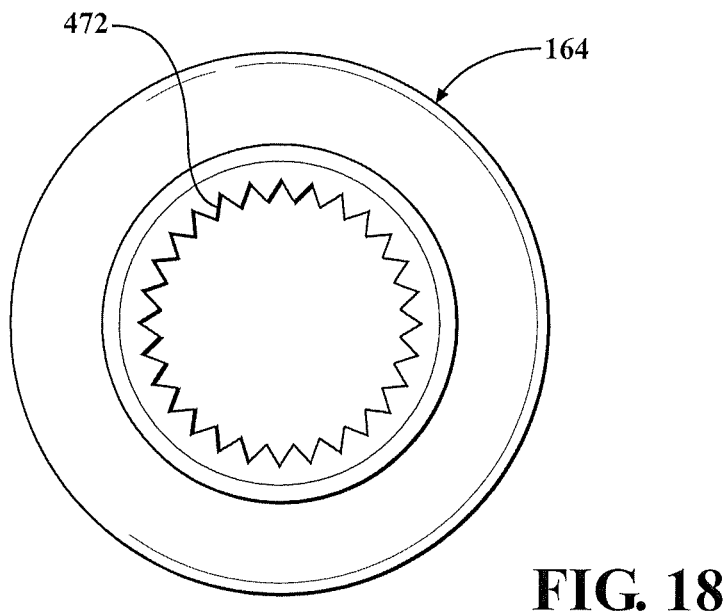
FIG. 18 illustrates a top view of an upper pivot ball shown in FIG. 13 according to an embodiment of the present invention.
Figure 19:
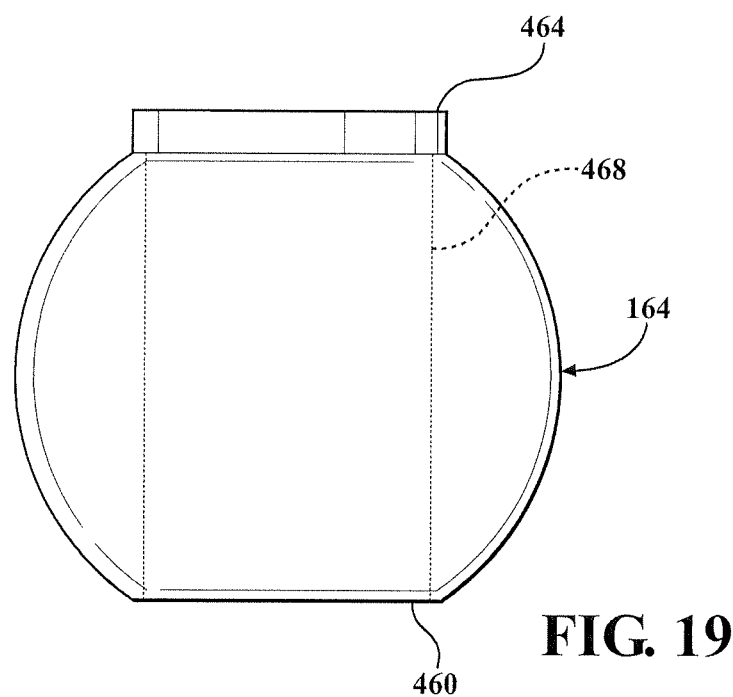
FIG. 19 illustrates a side view of the upper pivot ball of FIG. 18 according to an embodiment of the present invention.

A perspective view and a side view of the upper pivot ball 164 are shown in FIGS. 18 and 19, respectively. The upper pivot ball 164 has a generally spherical shape which may be truncated at one or both ends. The upper pivot ball 164 may have a generally cylindrical projection 464 extending from the upper pivot ball 164 as well as a central passageway 468 configured with an internal spline 472. It will be appreciated that the general shape and size of the upper pivot ball 164 may be selected based on an intended application. Further, the interior contour of the upper bearing 180, 186 is configured to matingly engage with the exterior contour of the upper pivot ball 164 when assembled into the articulating pivot 64.

Figure 20:
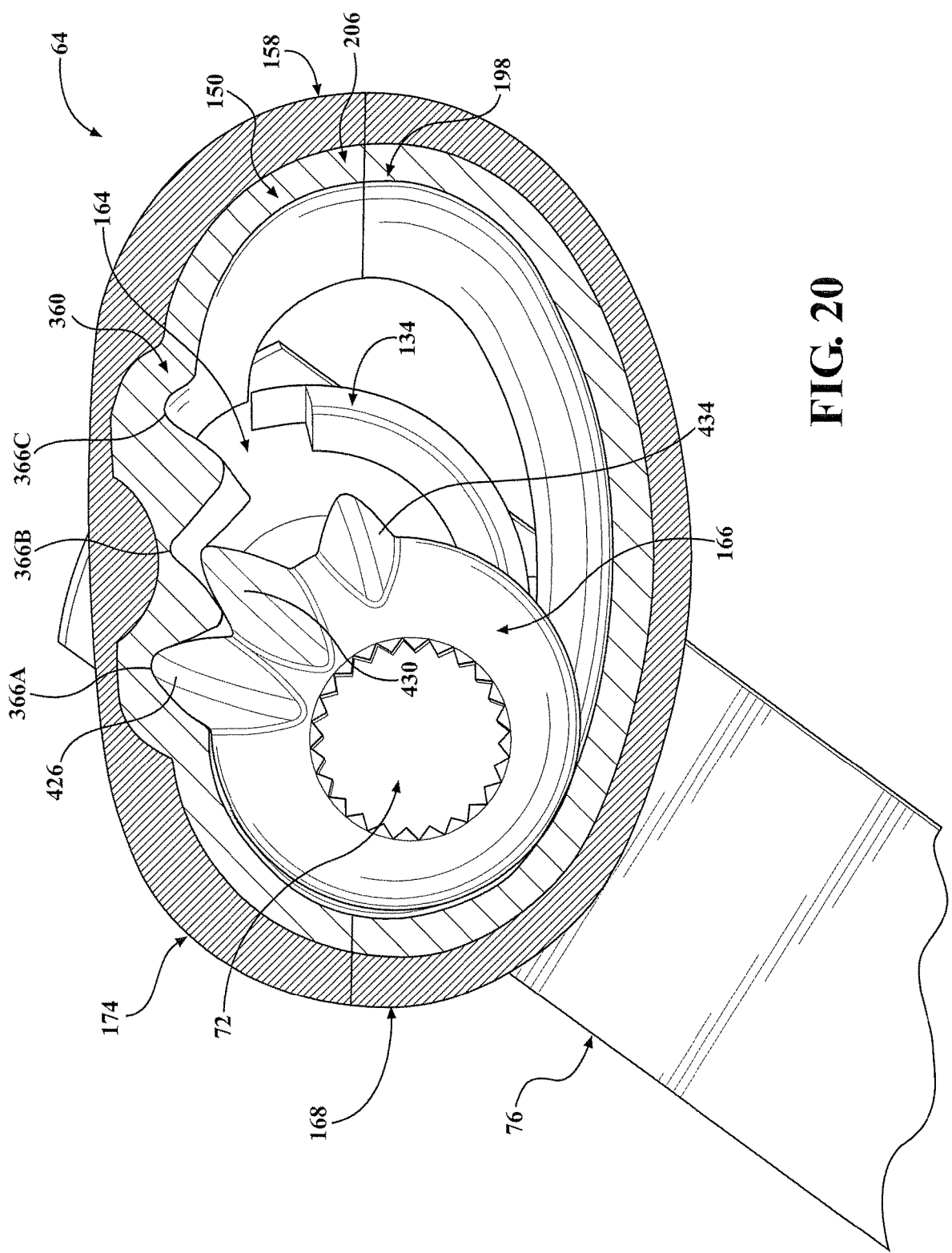
FIG. 20 illustrates a cross-sectional view of the articulating pivot of FIG. 3A according to an embodiment of the present invention.

A cut-away view of the articulating pivot assembly 64 is shown in FIG. 20 illustrating the general alignment of the pivot housing 158, the lower bearing assembly 150, the lower pivot ball 166, the pivot shaft 72, and the lever 76. The position of the articulating pivot assembly 64 shown in FIG. 20 is generally showing the position of the articulating pivot assembly 64 of FIG. 3 and of the windshield wiper system 10 of FIG. 1. The rack lower bearing 206 and the front lower bearing 198 are assembled to form the lower bearing assembly 150. The lower bearing assembly 150 has a generally elliptical shape with a non-linear rack integrated into one side of the lower bearing assembly 150. The front housing 168 and the rack housing 174 are assembled to form the pivot housing 158. The outer contour of the lower bearing assembly 150 matingly engages with the interior of the pivot housing 158. The gear teeth 426, 430, 434 on the lower pivot ball 166 are a non-circular pinion gear and are aligned to mesh with the non-linear rack 366A, 366B, 366C in the lower bearing assembly 150 as the lever 76 is rotated. It will be appreciated that the gear teeth 426, 430, 434 may be any number, size, or orientation of teeth suitable for an intended application and may further be a circular or a non-circular pinion gear.

Figure 21:
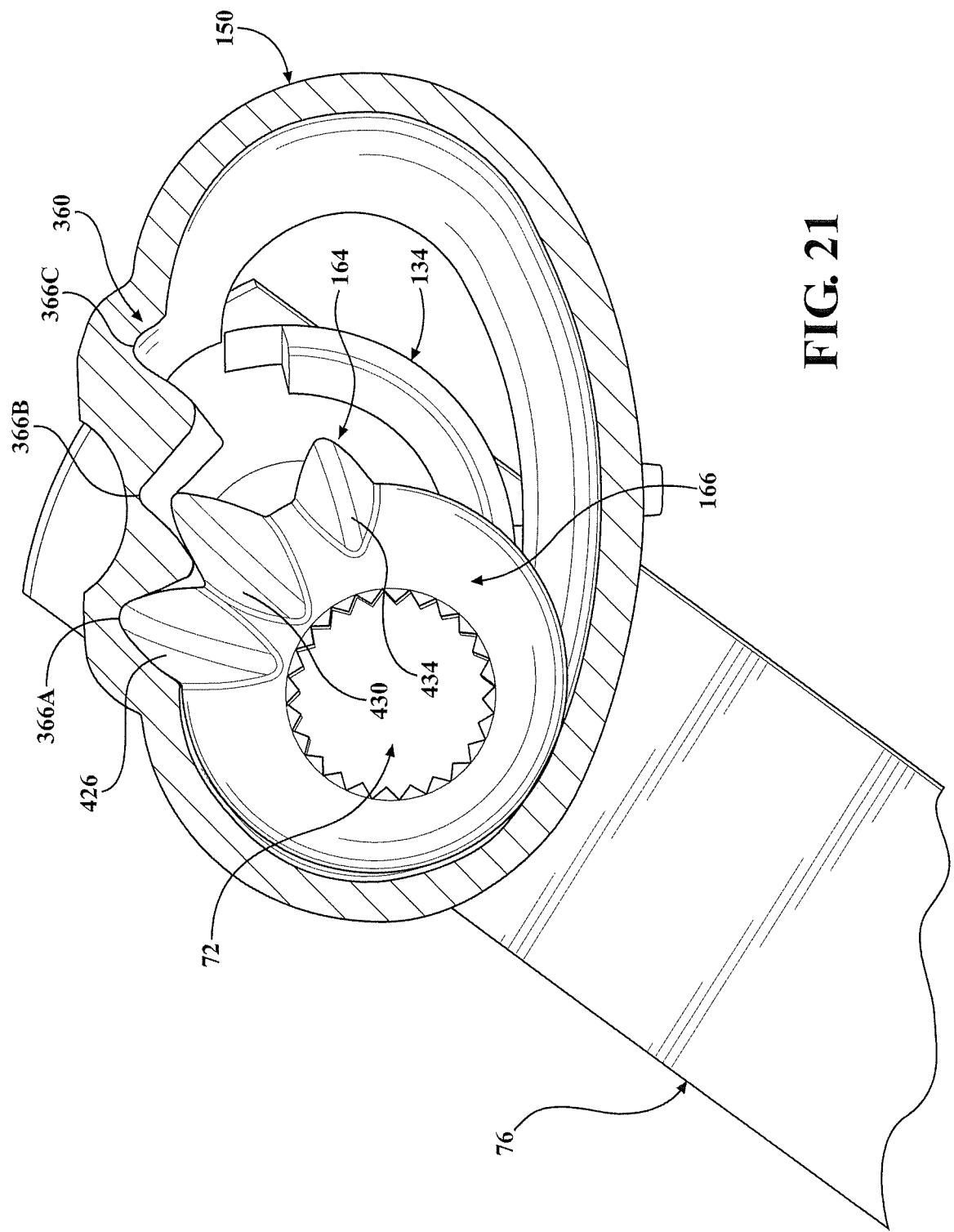
FIG. 21 illustrates a cross-sectional view of the articulating pivot of FIG. 20 in a first position according to an embodiment of the present invention.
Figure 22:
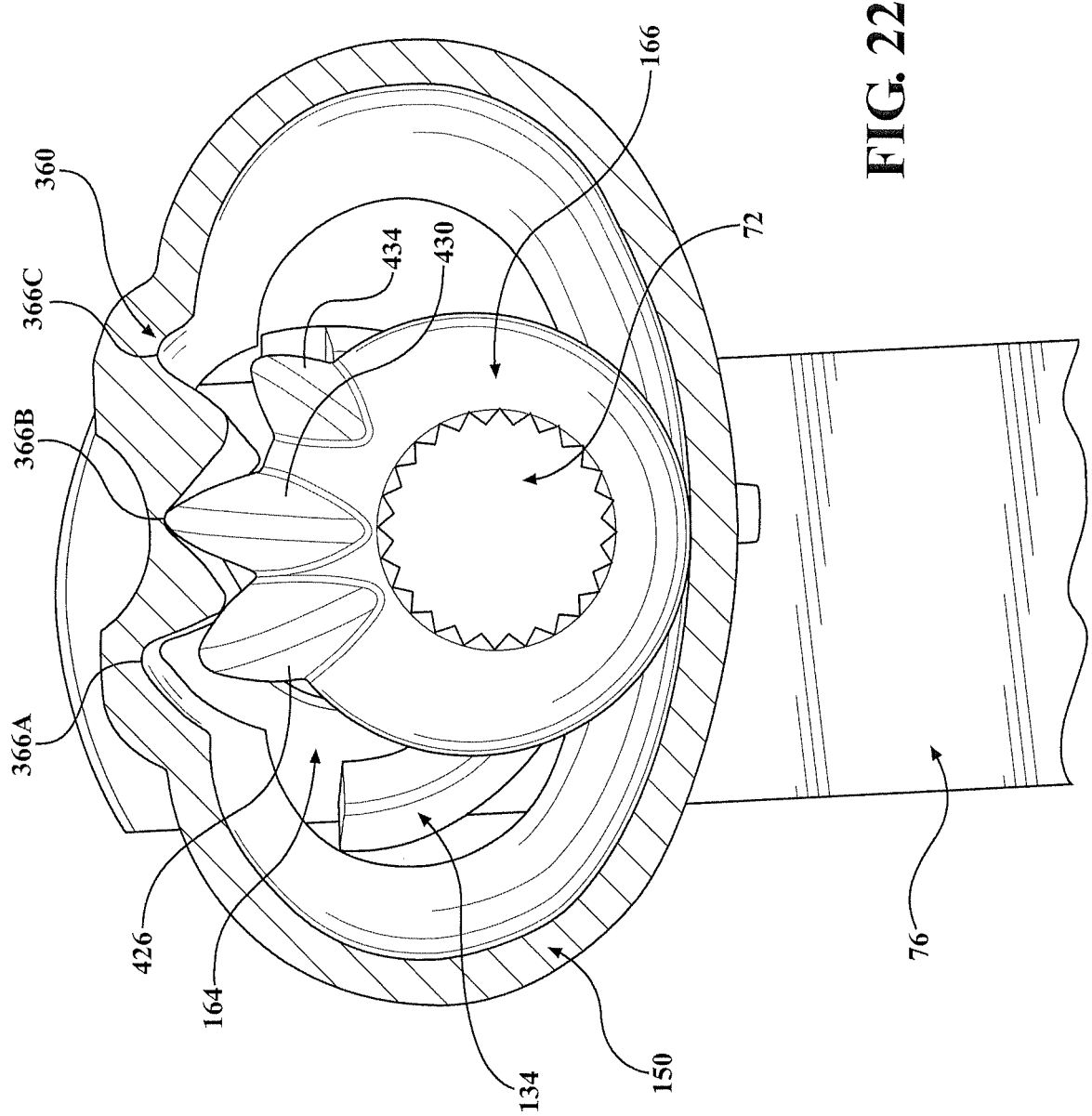
FIG. 22 illustrates a cross-sectional view of the articulating pivot of FIG. 20 in a second position according to an embodiment of the present invention.
Figure 23:
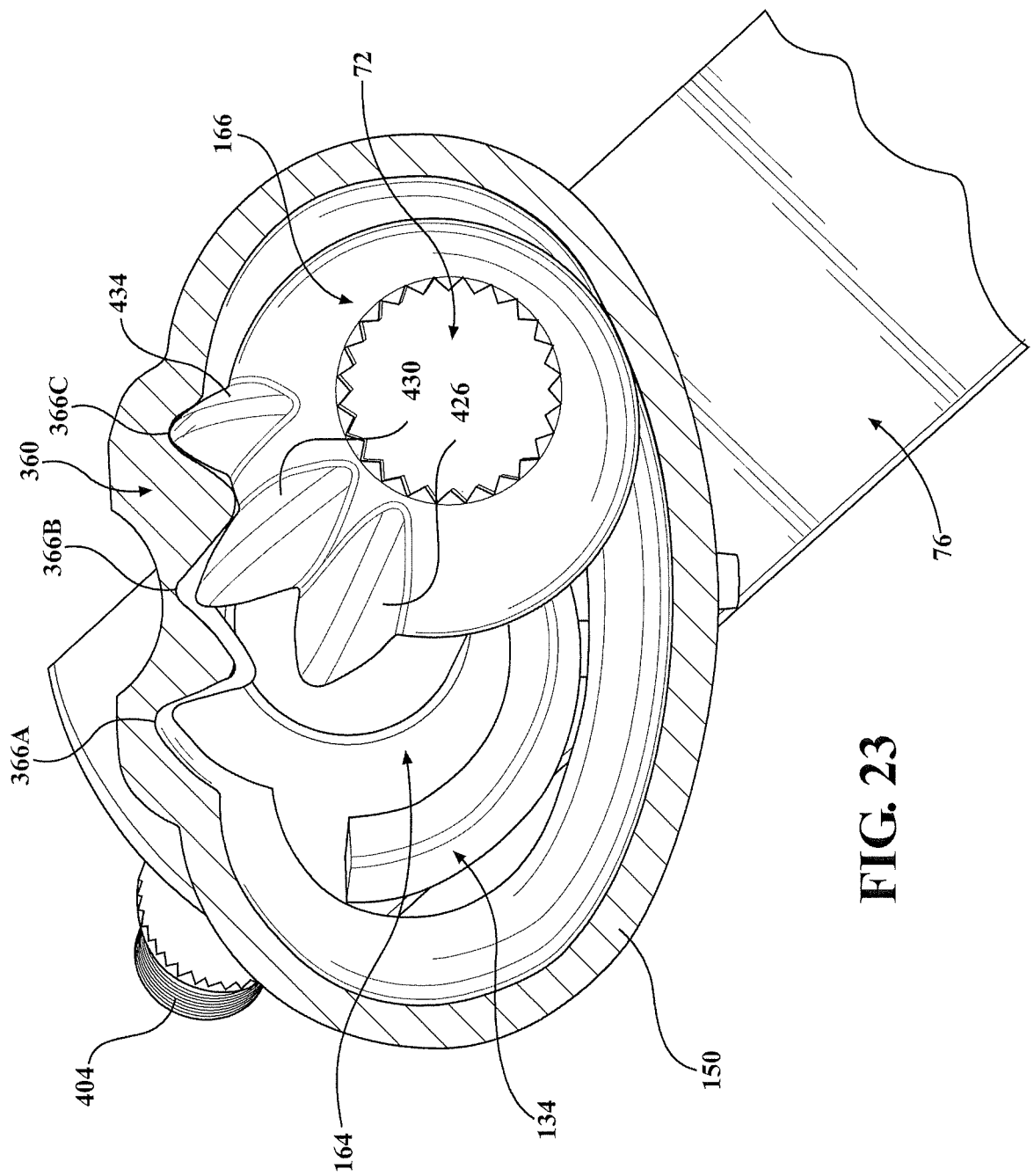
FIG. 23 illustrates a cross-sectional view of the articulating pivot of FIG. 20 in a third position according to an embodiment of the present invention.

The articulation of the pivot shaft 72 as the lever 76 is rotated is generally shown in FIGS. 21-23. The pivot housing 158 has been omitted for clarity. The position of the pivot shaft 72 shown in FIG. 21 generally matches the position of the pivot shaft 72 in FIGS. 1 and 3. The first tooth 426 on the lower pivot ball 166 is meshingly engaged with the first notch 366A in the non-linear rack 360. As the lever 76 is rotated towards a mid-point, the first tooth 426 disengages from the first notch 366A and the second tooth 430 meshes with the second notch 366B as shown in FIG. 22. Comparing the relative positions of the lower pivot ball 166 and the upper pivot ball 166 between FIGS. 21 and 22 illustrates the articulation of the pivot shaft 72 as the lever 76 is rotated.

The position of the lower pivot ball 166 with the third tooth 434 meshingly engaged with the third notch 366C is shown in FIG. 23. The position of the pivot shaft 72 shown in FIG. 23 generally matches the position of the pivot shaft 72 in FIGS. 2 and 4. Also shown is the upper pivot ball 164 as well as the threaded end 404 of the pivot shaft 72. Comparing the relative positions of the lower pivot ball 166 and the upper pivot ball 166 between FIGS. 21, 22, and 23 further illustrates the articulation of the pivot shaft 72 as the lever 76 is rotated. When the rotation of the lever 76 is reversed (i.e. moving in a clockwise direction from a position as shown in FIG. 23), the lower pivot ball 166 is rotated towards a middle position (FIG. 22) and towards the first position shown in FIG. 21. This movement changes the articulation of the pivot shaft 72 from the position shown in FIG. 4 to the position shown in FIG. 3.

The rotating upper pivot ball 164 on the pivot shaft 72 provides three degrees of freedom of motion. The articulating lower pivot ball 166 provides four degrees of freedom and ties the X, Y, and Z-axis articulation to the rotation of the pivot shaft 72 through a gear and rack system. The gear is represented by the teeth 426, 430, 434 on the lower pivot ball 166. The rack is represented by the non-linear rack 360 integrated into the lower bearing 150. By controlling the X, Y, and Z articulation of the lower pivot ball 166 center, the orientation of the pivot shaft 72 is altered throughout the wipe cycle. The altering of the pivot shaft 72 orientations with respect to the glass surface changes the attack angle on the glass.

FIGS. 24 and 25 illustrate alternate embodiments of a windshield wiper system 10 having one or more articulating pivot assemblies 64, 64'. It will be appreciated that any combination of articulating 64, 64' and/or non-articulating pivot assemblies 22 suitable for an intended application may be used. Likewise, any number and/or configuration of links 40, 44, levers 48, 76, 76' and internal configuration of the articulating pivot assemblies 64, 64' (including the upper and lower pivot balls 164, 166 and the rack 360) suitable for an intended application may be used. FIG. 24 illustrates a perspective view of the windshield wiper system 10 for a vehicle (not shown), according to another embodiment of the present invention, having the motor 14 coupled to a wiper linkage system 18 to drive rotation of a first articulating pivot assembly 64 and a second articulating pivot assembly 64'. The motor 14 rotates the drive shaft 32 which rotates the motor drive lever 36. The motor drive lever 36 is rotatably coupled with one or more links 40, 44. Link 40 is rotatably coupled with a first pivot lever 76' which is further fixedly coupled with a first articulating pivot shaft 72'. Link 44 is rotatably coupled with a second articulating pivot lever 76 which is further fixedly coupled with a second articulating pivot shaft 72.

FIG. 25 illustrates a perspective view of the windshield wiper system 10 for a vehicle (not shown) having the motor 14 coupled to a wiper linkage system 18 to drive rotation of a single articulating pivot assembly 64 according to another embodiment of the present invention. The motor 14 rotates the drive shaft 32 which rotates the motor drive lever 36. The motor drive lever 36 is rotatably coupled with link 44. Link 44 is rotatably coupled with a pivot lever 76 that is further fixedly coupled with an articulating pivot shaft 72.

Figure 26:
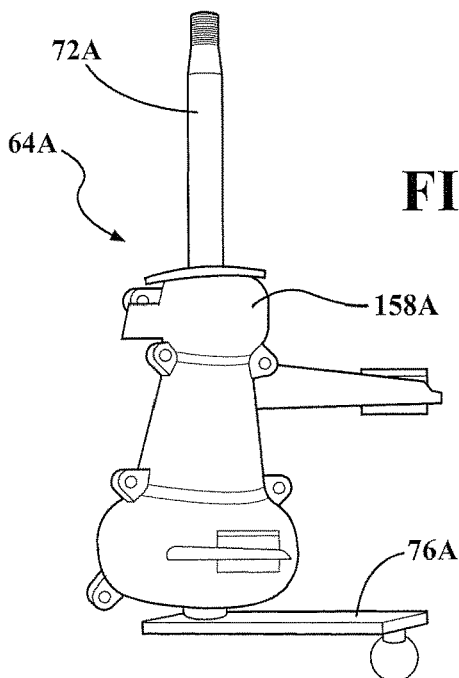
FIG. 26 illustrates a perspective view of an articulating pivot according to a fourth embodiment of the present invention.
Figure 28:
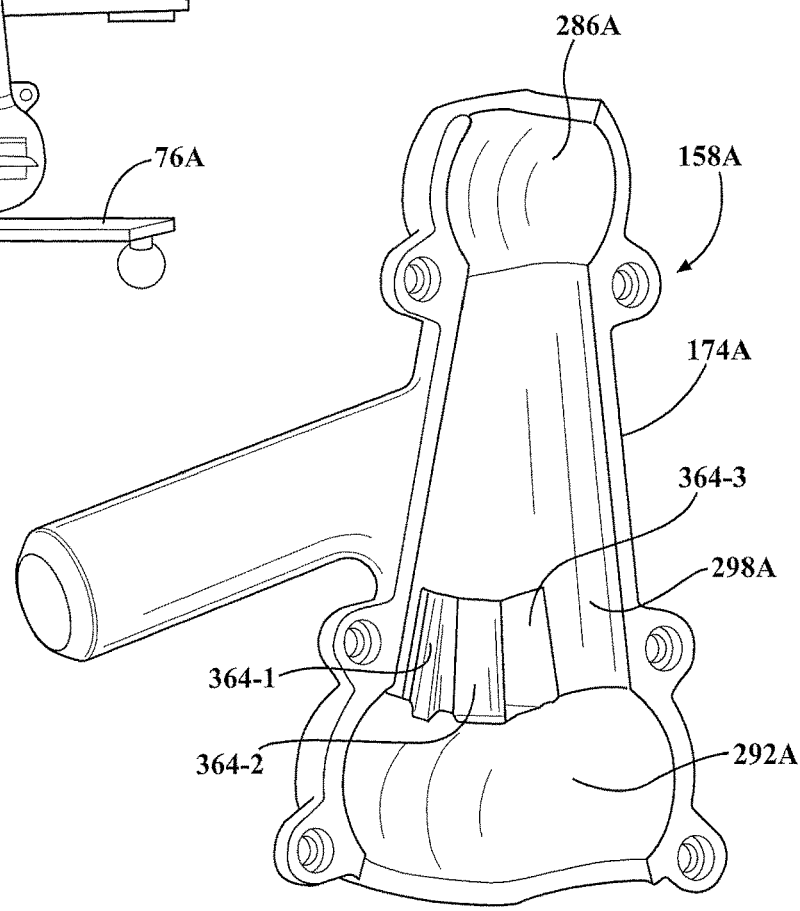
FIG. 28 illustrates a perspective view of a rack pivot, housing according to the fourth embodiment of the present invention.
Figure 27:
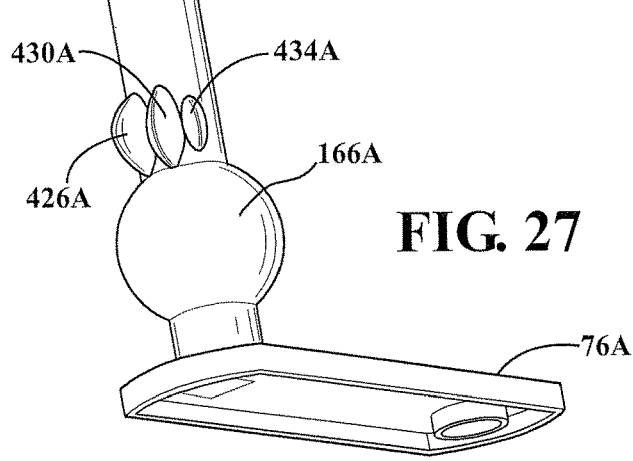
FIG. 27 illustrates a perspective view of a pivot shaft assembly according to the fourth embodiment of the present invention.

FIGS. 26-28 illustrate an alternate embodiment of an articulating pivot assembly 64A having an articulating pivot lever 76A fixedly coupled with a lower end of an articulating pivot shaft 72A with the pivot shaft 72A passing through a pivot housing assembly 158A. While not specifically shown, the pivot assembly 64A is constructed similarly to the pivot assembly 64 shown in FIG. 5, i.e., the pivot housing assembly 158A comprises a front housing 168 and a rack housing 174A. The rack housing 174A is illustrated in FIG. 28. Further, as in the first embodiment, the pivot housing assembly 158A has first and second bearings 134, 150 (not shown) inserted into first and second bearing cavities 286A, 292A in the front housing 168 and the rack housing 174A.

As illustrated in FIG. 27, the pivot shaft 72A is part of an articulating pivot shaft assembly 130A which has a first ball 164A and a second ball 166A fixedly coupled with the pivot shaft 72A. The articulating pivot lever 76A is fixedly coupled with the lower end of the pivot shaft 72A. The articulating pivot lever 76A may be fixedly coupled at any point along the articulating pivot shaft 72A. Additionally, the first ball 164A, the second ball 166A, and the pivot shaft 72A may be formed as an integrated unit.

The pivot shaft 72A has one or more gear teeth 426A, 430A, 434A projecting radially from the cylindrical shaft surface 72A as shown in FIG. 27. Both the first ball 164A and the second ball 166A are generally spherical and lack teeth and/or notches.

The interior profile of the rack housing assembly 174A is shown in FIG. 28. The bearing cavities 286A, 292A are contoured to retain a respective bearing (not shown), similarly as in the first embodiment. A central cavity 298A has one or more teeth 364-1, 364-2, 364-3 forming a rack and configured to matingly engage with one or more gear teeth 426A, 430A, 434A on the pivot shaft 72A as the pivot shaft 72A is rotated. While not specifically shown, a third bearing having an integrated rack may be inserted into the central cavity 298A such that the one or more gear teeth 426A, 430A, 434A matingly engage with the rack integrated within the third bearing.

Alternatively, the pivot shaft 72A may have notches (not shown) in the shaft surface 72A which matingly engage with teeth 364-1, 364-2, 364-3 projecting from the interior surface 298A of the pivot housing assembly 158A and/or from an interior surface of a housing bearing (not shown) similar as bearing 206 shown in FIG. 10.

One benefit of wiper system having one or more articulating pivot shafts is an improvement in wipe performance on highly wrapped glass. A second benefit is dynamically adjusting the angle of orientation of the wiper blade rubber element to the glass surface. An additional benefit is maintaining the blade attack angles within a desired range for highly curved glass surfaces. Also, the non-linear rack roll line combined with the non-circular pinion gear profile incorporated within the pivot housing allows for adjustment of the articulation of the pivot shaft to accommodate a variety of curved glass surfaces. It will be appreciated that any combination of a linear or non-linear rack with a circular or non-circular pinion gear suitable for an intended application may be used, i.e. a linear rack pitch line combined with a circular pinion gear profile may result in a desired articulation of the pivot shaft for a specific application. Likewise, it will be appreciated that any combination of one or more articulating pivot assemblies, and optionally non-articulating pivot assemblies, may be used within a single windshield wiper system as suitable for an intended application.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. An articulating pivot assembly for a vehicle windshield wiper system, said articulating pivot assembly comprising:
   a pivot shaft having a distal end, a proximal end, and a shaft longitudinal axis;
   a lever having a proximal end and a distal end, said proximal end fixedly coupled with said pivot shaft;
   an upper pivot ball having a first passageway extending through said upper pivot ball, said upper pivot ball fixedly coupled with said pivot shaft with said pivot shaft extending through said first passageway;
   a lower pivot ball having at least one gear tooth projecting radially outward from an exterior surface of said lower pivot ball, said lower pivot ball having a second passageway extending through said lower pivot ball, said lower pivot ball fixedly coupled with said pivot shaft adjacent said pivot shaft proximal end with said pivot shaft extending through said second passageway; and
   a rack having at least one notch configured to meshingly engage with said at least one gear tooth;
   wherein moving said distal end of said lever rotates said pivot shaft such that said at least one gear tooth meshingly engages with said at least one notch in said rack repositioning said pivot shaft proximal end which articulates said pivot shaft between a first shaft orientation and a second shaft orientation different from said first shaft orientation.

2. The articulating pivot assembly as set forth in claim 1, wherein said upper pivot ball is rotatably retained by an upper bearing.

3. The articulating pivot assembly as set forth in claim 2, wherein:
said lower pivot ball is rotatably retained by a lower bearing; and
said rack is integrated with said lower bearing.

4. The articulating pivot assembly as set forth in claim 3, wherein said rack comprises a plurality of notches.

5. The articulating pivot assembly as set forth in claim 4, wherein said at least one gear tooth comprises a plurality of gear teeth.

6. The articulating pivot assembly as set forth in claim 5, wherein said plurality of gear teeth form a pinion configured to meshingly engage with said rack as said pivot shaft is rotated.

7. The articulating pivot assembly as set forth in claim 6, wherein at least two of said plurality of gear teeth have dissimilar tooth profiles.

8. The articulating pivot assembly as set forth in claim 7, wherein said pinion is a non-circular pinion.

9. The articulating pivot assembly as set forth in claim 7, wherein said pinion is a circular pinion.

10. The articulating pivot assembly as set forth in claim 7, wherein said rack is a non-linear rack.

11. The articulating pivot assembly as set forth in claim 7, wherein said rack is a linear rack.

12. An articulating pivot assembly for a vehicle windshield wiper system, said articulating pivot assembly comprising:
a pivot shaft having a distal end, a proximal end, and a shaft longitudinal axis;
a first pivot ball having a first passageway extending through said first pivot ball, said first pivot ball fixedly coupled with said pivot shaft with said pivot shaft extending through said first passageway;
a second pivot ball having at least one gear tooth projecting radially outward from an exterior surface of said second pivot ball, said second pivot ball having a second passageway extending through said second pivot ball, said second pivot ball fixedly coupled with said pivot shaft and spaced apart from said first pivot ball with said pivot shaft extending through said second passageway; and
a rack having at least one notch configured to meshingly engage with said at least one gear tooth;
wherein rotating said pivot shaft from a first rotational position wherein said at least one gear tooth meshingly engages with said at least one notch in said rack to a second rotational position wherein said at least one gear tooth meshingly disengages with said at least one notch in said rack repositions said pivot shaft proximal end which articulates said pivot shaft between a first shaft orientation and a second shaft orientation different from said first shaft orientation.

13. The articulating pivot assembly as set forth in claim 12, wherein said at least one notch comprises a plurality of notches.

14. The articulating pivot assembly as set forth in claim 13, wherein said at least one gear tooth comprises a plurality of gear teeth.

15. The articulating pivot assembly as set forth in claim 14, wherein:
said first pivot ball is rotatably retained by a first bearing;
said second pivot ball is rotatably retained by a second bearing; and
said rack is integrated with said second bearing.

16. The articulating pivot assembly as set forth in claim 15, wherein:
said second bearing has a generally elliptical shape; and
said first bearing has a generally circular shape.

17. The articulating pivot assembly as set forth in claim 15, wherein said rack is a non-linear rack.

18. The articulating pivot assembly as set forth in claim 15, wherein said rack is a linear rack.

19. The articulating pivot assembly as set forth in claim 15, wherein at least two of said plurality of gear teeth have dissimilar tooth profiles.

20. The articulating pivot assembly as set forth in claim 15, wherein:
said first bearing is an upper bearing and said second bearing is a lower bearing;
said lower bearing is fixedly coupled to said pivot shaft adjacent said proximal end; and
said upper bearing is fixedly coupled to said pivot shaft between said lower bearing and said distal end of said pivot shaft.

21. The articulating pivot assembly as set forth in claim 15, wherein:
said first bearing is a lower bearing and said second bearing is an upper bearing;
said lower bearing is fixedly coupled to said pivot shaft adjacent said proximal end; and
said upper bearing is fixedly coupled to said pivot shaft between said lower bearing and said distal end of said pivot shaft.

22. A windshield wiper system for a vehicle, said windshield wiper system comprising:
a first link having a first end and a second end;
a motor rotatably coupled with said first end of said first link; and
a first articulating pivot assembly comprising:
a pivot shaft having a distal end, a proximal end, and a shaft longitudinal axis;
a lever having a proximal end and a distal end, said proximal end fixedly coupled with said pivot shaft and said distal end rotatably coupled with said second end of said first link;
a first pivot ball having a first passageway extending through said first pivot ball, said first pivot ball fixedly coupled with said pivot shaft with said pivot shaft extending through said first passageway;
a second pivot ball having at least one gear tooth projecting radially outward from an exterior surface of said second pivot ball, said second pivot ball having a second passageway extending through said second pivot ball, said second pivot ball fixedly coupled with said pivot shaft and spaced apart from said first pivot ball with said pivot shaft extending through said second passageway; and
a rack having at least one notch configured to meshingly engage with said at least one gear tooth;
wherein rotating said motor repositions said first link which repositions said distal end of said lever which rotates said pivot shaft such that said at least one gear tooth meshingly engages with said at least one notch in said rack and repositions said pivot shaft proximal end which articulates said pivot shaft between a first shaft orientation and a second shaft orientation different from said first shaft orientation.

23. The windshield wiper system as set forth in claim 22, wherein said windshield wiper system comprises:
- a second link having a first end and a second end;
- said motor rotatably coupled with said first end of said second link; and
- a second articulating pivot assembly rotatably coupled with said second end of said second link;
- wherein rotating said motor repositions said second link which rotates said second articulating pivot assembly between a third shaft orientation and a forth shaft orientation different from said third shaft orientation.

24. A method of articulating a pivot shaft of an articulating pivot assembly for a vehicle windshield wiper system between one of a first shaft orientation and a second shaft orientation, said method comprising:
- providing an articulating pivot assembly comprising:
  - a first pivot ball having a passageway therethrough and rotatably retained by a first pivot bearing;
  - a second pivot ball having a passageway therethrough and a first gear tooth projecting radially outward from an exterior surface of said second pivot ball, said second pivot ball rotatably retained by a second pivot bearing;
  - said second pivot bearing having a rack with a first notch configured to matingly engage with said first gear tooth; and
  - a pivot shaft having an upper end and a lower end, said pivot shaft passing through said passageway in said first pivot ball and in said second pivot ball, said pivot shaft fixedly coupled to said first pivot ball and to said second pivot ball; and
- rotating said pivot shaft from a first rotational position wherein said first gear tooth is meshingly engaged with said first notch to a second rotational position wherein said first gear tooth meshingly disengages from said first notch;
- wherein said pivot shaft moves from a first pivot shaft orientation when said first gear tooth is meshingly engaged with said first notch to a second pivot shaft orientation when said first gear tooth is meshingly disengaged from said first notch.

25. The method as set forth in claim 24, said method comprising:
- providing a second notch in said rack and providing a second gear tooth projecting from said exterior surface of said second pivot ball; and
- rotating said pivot shaft from a third rotational position wherein said second gear tooth is meshingly engaged with said second notch to a fourth rotational position wherein said second gear tooth meshingly disengages from said second notch;
- wherein said pivot shaft moves from a third pivot shaft orientation when said second gear tooth is meshingly engaged with said second notch to a fourth pivot shaft orientation when said second gear tooth is meshingly disengaged from said second notch.

26. The method as set forth in claim 25, said method comprising:
- rotating said pivot shaft in a first rotational direction from said first rotational position towards said second rotational position wherein said pivot shaft articulates from said first pivot shaft orientation towards said second pivot shaft orientation; and
- rotating said pivot shaft in a second rotational direction different from said first rotational direction from said second rotational position towards said first rotational position wherein said pivot shaft articulates from said second pivot shaft orientation towards said first pivot shaft orientation.

27. An articulating pivot assembly for a vehicle windshield wiper system, said articulating pivot assembly comprising:
- a pivot shaft having a distal end, a proximal end, a shaft longitudinal axis, and at least one gear tooth projecting radially outward from an exterior surface of said pivot shaft;
- a lever having a proximal end and a distal end, said proximal end fixedly coupled with said pivot shaft;
- a first pivot ball having a first passageway extending through said first pivot ball, said first pivot ball fixedly coupled with said pivot shaft with said pivot shaft extending through said first passageway;
- a second pivot ball having a second passageway extending through said second pivot ball, said second pivot ball fixedly coupled with said pivot shaft with said pivot shaft extending through said second passageway; and
- a rack having at least one notch configured to meshingly engage with said at least one gear tooth;
- wherein moving said distal end of said lever rotates said pivot shaft such that said at least one gear tooth meshingly engages with said at least one notch in said rack repositioning said pivot shaft proximal end which articulates said pivot shaft between a first shaft orientation and a second shaft orientation different from said first shaft orientation.

\* \* \* \* \*